United States Patent
O Connell et al.

(10) Patent No.: US 10,589,772 B2
(45) Date of Patent: Mar. 17, 2020

(54) VEHICLE THAT IS CONVERTIBLE TO MULTIPLE CONFIGURATIONS

(71) Applicant: YVOLVE SPORTS LTD., Dublin (IE)

(72) Inventors: Thomas O Connell, Castleblayney (IE); Matthew Ernest Golias, Melbourne (AU)

(73) Assignee: YVOLVE SPORTS LIMITED, Dublin (IE)

( * ) Notice: Subject to any disclaimer, the term of this patent is extended or adjusted under 35 U.S.C. 154(b) by 82 days.

(21) Appl. No.: 15/517,444

(22) PCT Filed: Oct. 7, 2015

(86) PCT No.: PCT/EP2015/073177
§ 371 (c)(1),
(2) Date: Apr. 6, 2017

(87) PCT Pub. No.: WO2016/055538
PCT Pub. Date: Apr. 14, 2016

(65) Prior Publication Data
US 2017/0291629 A1    Oct. 12, 2017

Related U.S. Application Data

(60) Provisional application No. 62/061,047, filed on Oct. 7, 2014.

(30) Foreign Application Priority Data

Oct. 23, 2014   (CN) .......................... 2014 1 0573748

(51) Int. Cl.
*B62B 7/12*      (2006.01)
*B62K 3/00*      (2006.01)
(Continued)

(52) U.S. Cl.
CPC ............... *B62B 7/12* (2013.01); *B62K 3/002* (2013.01); *B62K 9/02* (2013.01); *B62K 13/04* (2013.01);
(Continued)

(58) Field of Classification Search
CPC . B62B 7/12; B62B 2206/006; B62B 2301/25; B62K 3/002; B62K 13/04; B62K 9/02; B62K 15/006
(Continued)

(56) References Cited

U.S. PATENT DOCUMENTS 6,575,486 B2 *   6/2003   Ma ........................... B62K 9/02
                                                      280/282
6,641,456 B2 *  11/2003   Wang ....................... B62K 9/00
                                                      280/87.021
(Continued)

FOREIGN PATENT DOCUMENTS

CN         2161546 Y      4/1994
CN       202935507 U      5/2013
(Continued)

OTHER PUBLICATIONS

PCT/EP2015/073177, International Search Report & Written Opinion, dated Dec. 10, 2015, European Patent Office.
(Continued)

*Primary Examiner* — Joseph M Rocca
*Assistant Examiner* — Felicia L. Brittman
(74) *Attorney, Agent, or Firm* — Millman IP Inc.

(57) ABSTRACT

In an aspect a vehicle is provided, and includes a frame a front wheel and a rear assembly. The front wheel is rotatably mounted to the frame. The rear assembly includes a first rear wheel support and a second rear wheel support. Each of the wheel supports is movably mounted to the frame. The rear assembly further includes a first rear wheel and a second rear
(Continued)

wheel. The first and second rear wheels are rotatably mounted to the first rear wheel supports respectively. The rear assembly is positionable in a first position in which the first and second rear wheels are substantially immediately adjacent one another to operate as a single rear wheel, and a second position in which the first and second rear wheels are spaced apart from one another.

16 Claims, 25 Drawing Sheets

(51) Int. Cl.
  *B62K 9/02*   (2006.01)
  *B62K 13/04*  (2006.01)
  *B62K 15/00*  (2006.01)

(52) U.S. Cl.
  CPC ...... *B62K 15/006* (2013.01); *B62B 2206/006* (2013.01); *B62B 2301/25* (2013.01)

(58) Field of Classification Search
  USPC ....................................................... 280/280
  See application file for complete search history.

(56) References Cited

U.S. PATENT DOCUMENTS

| | | | |
|---|---|---|---|
| 10,011,316 B2* | 7/2018 | Ben Meir | B62K 13/04 |
| 2004/0075230 A1 | 4/2004 | Lin | |
| 2010/0253035 A1* | 10/2010 | Miroewski | B62K 9/00 |
| | | | 280/200 |
| 2013/0140787 A1 | 6/2013 | Ko | |
| 2014/0265233 A1* | 9/2014 | Jessie, Jr. | B62K 13/04 |
| | | | 280/287 |

FOREIGN PATENT DOCUMENTS

| | | |
|---|---|---|
| CN | 203199112 U | 9/2013 |
| CN | 103635383 A | 3/2014 |
| WO | 2013/181872 A1 | 12/2013 |
| WO | 2014/080166 A1 | 5/2014 |
| WO | WO-2014080166 A1 * | 5/2014 ............ B62K 9/00 |

OTHER PUBLICATIONS

ZL 201520777015.9, Patent Evaluation Report, Chinese State Intellectual Property Office, dated Jan. 12, 2018.

* cited by examiner

VEHICLE THAT IS CONVERTIBLE TO MULTIPLE CONFIGURATIONS

CROSS-REFERENCE TO RELATED APPLICATIONS

This application claims the benefit of U.S. Provisional application No. 62/061,047, filed on Oct. 7, 2014 and Chinese Patent application No. 201410573748.0 filed on Oct. 23, 2014, the contents of both of which are incorporated herein by reference in their entirety.

FIELD OF INVENTION

This disclosure relates generally to vehicles and more specifically to children's vehicles that are convertible to different configurations to accommodate growth of the child.

BACKGROUND OF INVENTION

It is known to provide vehicles that can be changed to accommodate the growth of a child. For example, one such vehicle is a ride-on vehicle that includes a handle that can be held by an adult to push the child along when the child is too young to pedal the vehicle themselves. The vehicle includes footrests that can be lowered for the child to place their feet on. The vehicle can be reconfigured, however, by unmounting of the handle and retracting of the footrests to permit the child to pedal the vehicle once they are old enough and capable.

While such a vehicle is somewhat useful for children of a certain age, there is a need for a simple solution for children in an older age group, who may be transitioning from a tricycle to a bicycle. Some proposed vehicles exist for such conversion in the field of adult pedaled transportation, however it appears generally cumbersome to carry out such a conversion with these vehicles, and generally speaking, such conversions simply involve the removal or installation of a wheel and supporting structure.

SUMMARY

In a first aspect a vehicle is provided, and includes a frame a front wheel and a rear assembly. The front wheel is rotatably mounted to the frame. The rear assembly includes a first rear wheel support and a second rear wheel support. Each of the wheel supports is movably mounted to the frame. The rear assembly further includes a first rear wheel and a second rear wheel. The first and second rear wheels are rotatably mounted to the first and second rear wheel supports respectively. The rear assembly is positionable in a first position in which the first and second rear wheels are substantially immediately adjacent one another, and a second position in which the first and second rear wheels are spaced apart from one another.

In a second aspect, a vehicle is provided, having a frame having a first end and a second end, a first end wheel at the first end of the frame, and a second end assembly at the second end of the frame, wherein the second end assembly includes a left second end wheel support and a right second end wheel support. Each of the wheel supports is movably mounted to the frame. The second end assembly further includes a left second end wheel and a right second end wheel. The left and right second end wheels are rotatably mounted to the left and right second end wheel supports respectively. The second end assembly is positionable in a first position in which the left and right second end wheels are substantially immediately adjacent one another, and a second position in which the left and right second end wheels are spaced apart from one another.

In a third aspect, a vehicle is provided and includes a frame and a rear assembly that together are included in a structural assembly, a front wheel rotatably mounted to the structural assembly, and a first rear wheel and a second rear wheel. The first and second rear wheels are rotatably mounted relative to the structural assembly. The structural assembly is positionable in a first position in which the vehicle is a bicycle and a second position in which the vehicle is a tricycle.

Within the third aspect, in some embodiments the rear assembly includes a first rear wheel support and a second rear wheel support. Each of the wheel supports is movably mounted to the frame. The first and second rear wheels are rotatably mounted to the first rear wheel supports respectively. The rear assembly is positionable in a first position in which the first and second rear wheels are substantially immediately adjacent one another to operate as a single rear wheel, and a second position in which the first and second rear wheels are spaced apart from one another.

Within any of the first, second or third aspects above, optionally each of the first and second rear wheel supports has a forward end that is pivotally mounted to the frame and a rearward end that supports one of the first and second rear wheels.

Within any of the first, second or third aspects above, optionally each of the first and second rear wheels has a free end, and has a surface contour. When the rear assembly is in the first position the free ends face towards each other and the surface contours extend laterally towards each other substantially without discontinuity. Optionally the surface contour is such that the first and second rear wheels substantially only contact a ground surface at the respective free ends.

Within any of the first, second or third aspects above, optionally a set of pedals are operatively connected to the front wheel.

In another aspect, a vehicle is provided and includes a frame and a rear assembly that together are included in a structural assembly, a front wheel rotatably mounted to the structural assembly, and a first rear wheel and a second rear wheel. The first and second rear wheels are rotatably mounted relative to the structural assembly. The structural assembly is positionable in a position in which the vehicle is a tricycle and a position in which the vehicle is a scooter.

BRIEF DESCRIPTION OF THE DRAWINGS

The foregoing and other aspects of the disclosure will be more readily appreciated by reference to the accompanying drawings, wherein:

FIG. 13a shows a plan view of the rear wheels of the vehicle shown in FIGS. 12a-12c, when in the position shown in shown in FIG. 13a;

DETAILED DESCRIPTION OF EMBODIMENTS

Figure 1:
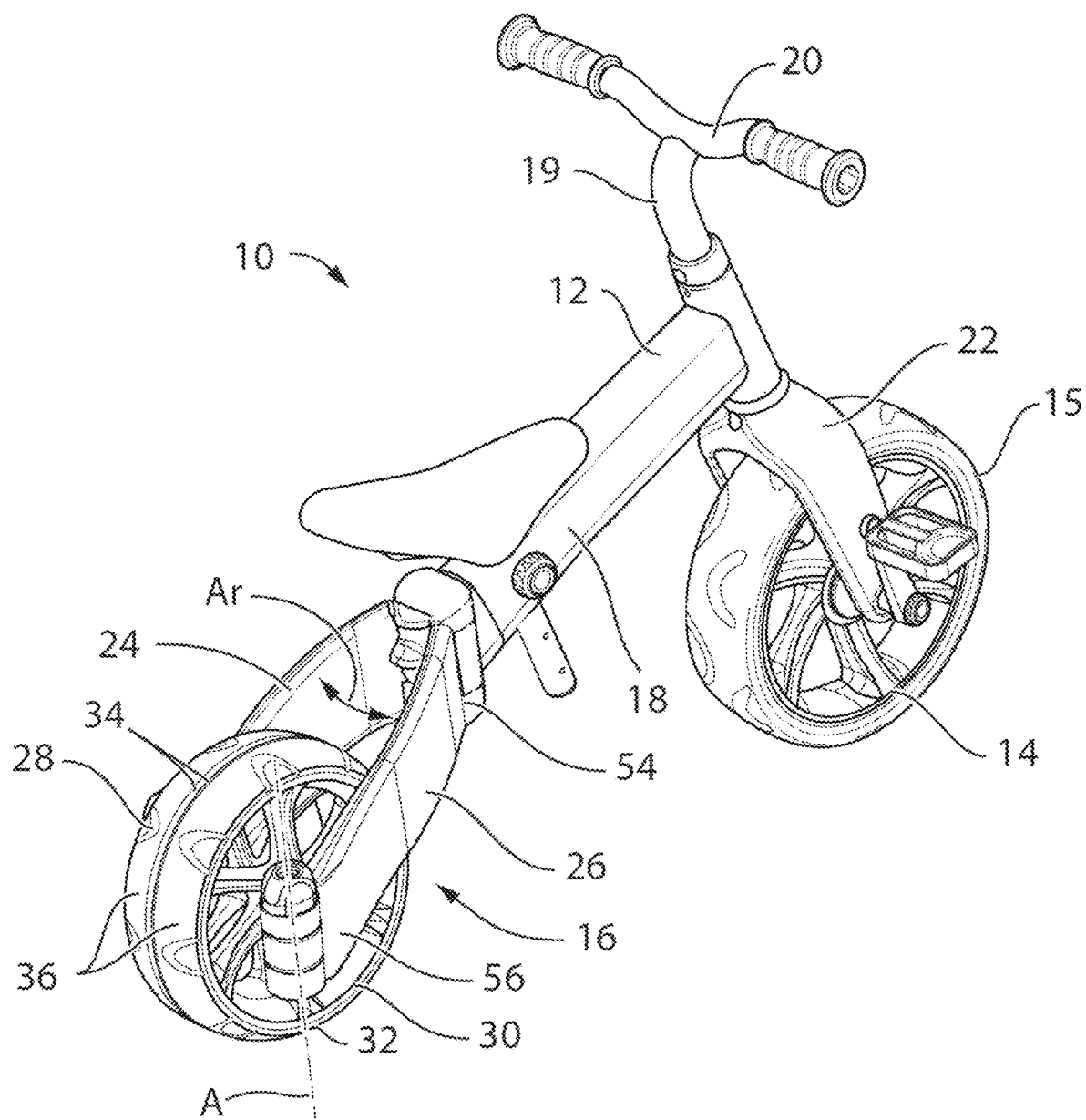
FIG. 1 is a perspective view of a vehicle in accordance with an embodiment of the present invention, in a first position.
Figure 2:
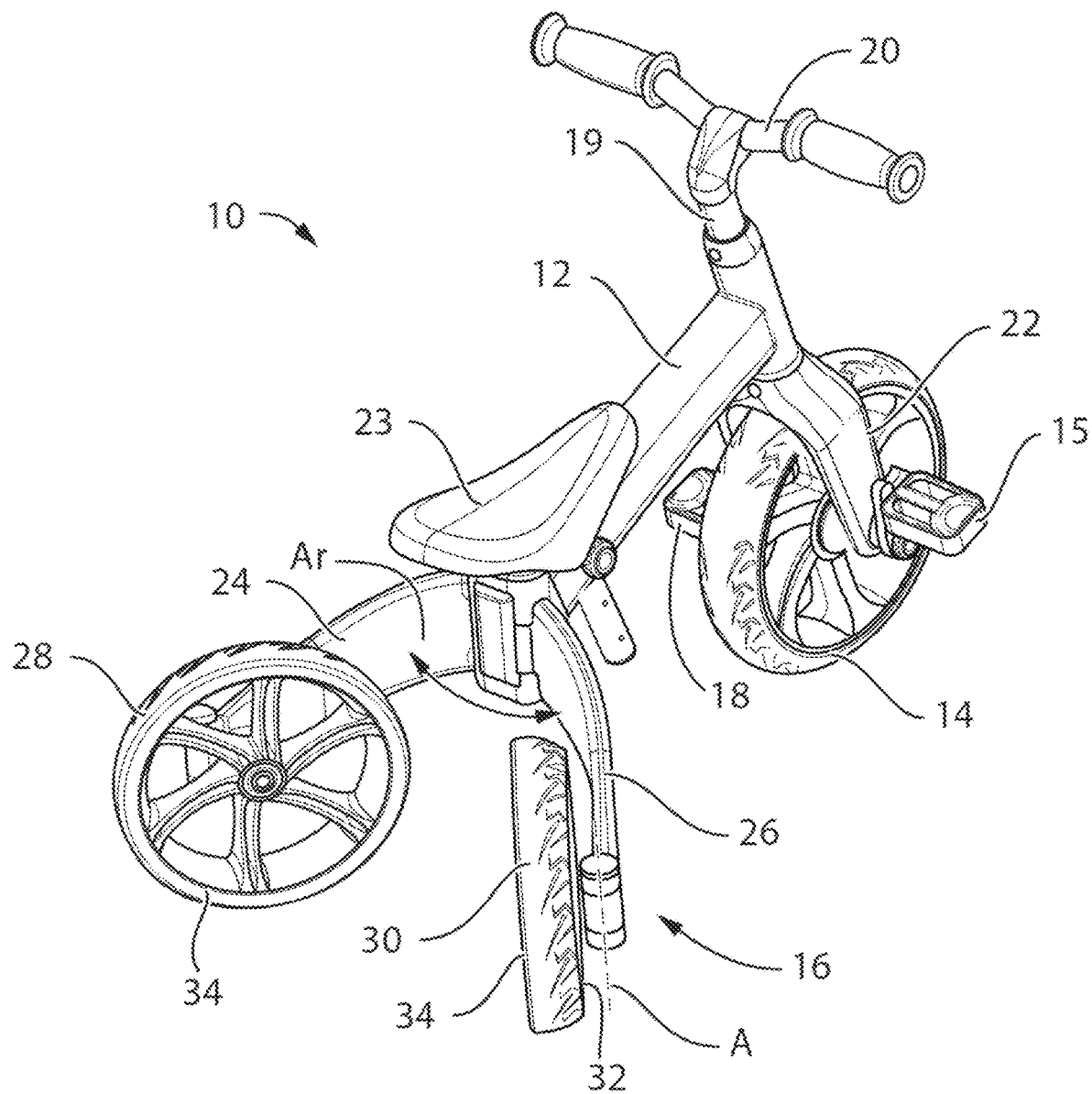
FIG. 2 is a perspective view of the vehicle shown in FIG. 1, in a transition position.
Figure 3:
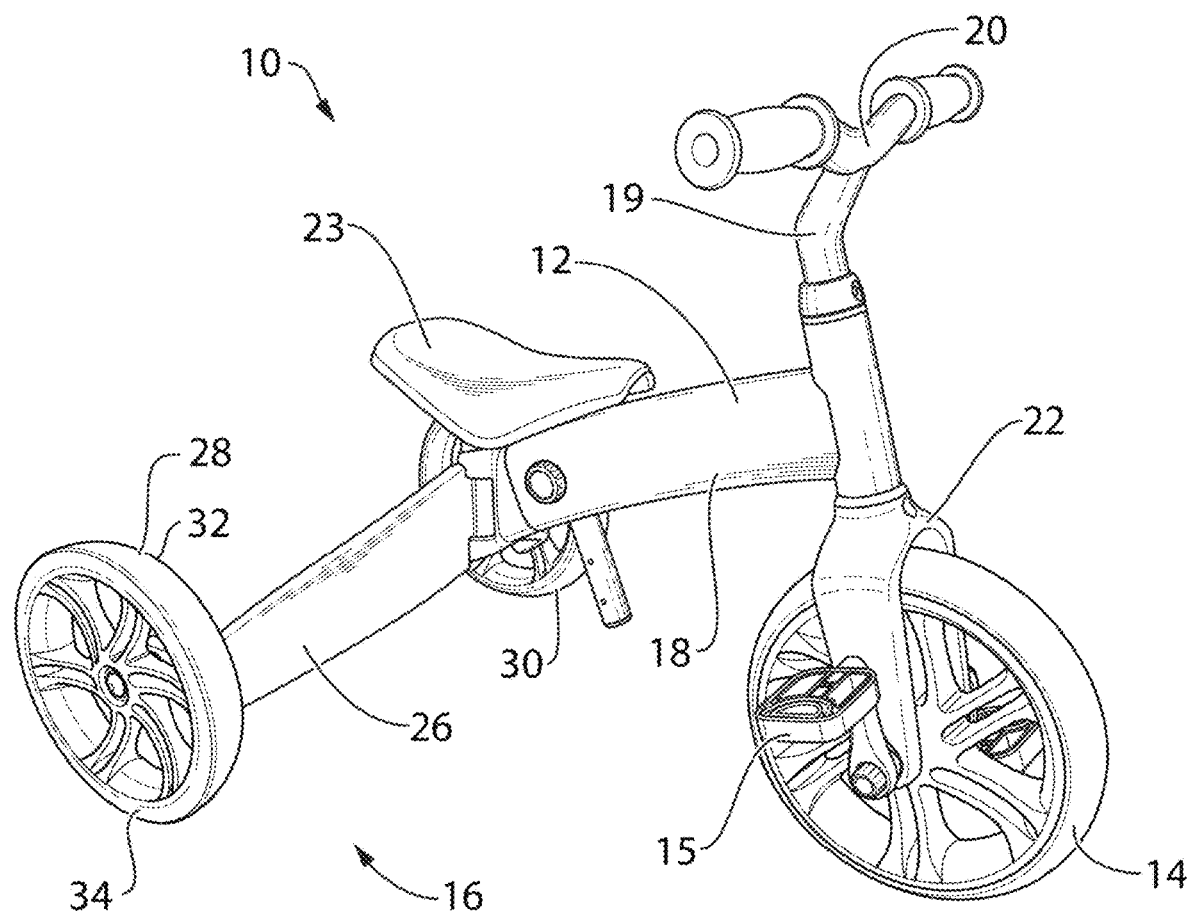
FIG. 3 is a perspective view of the vehicle shown in FIG. 1, in a second position.

Reference is made to FIG. 1, which shows a vehicle 10. The vehicle 10 may be convertible between a first form (also referred to as a first position) in which it is configured as a bicycle (FIG. 1) and a second form (also referred to as a second position) in which it is configured as a tricycle (FIG. 3). FIG. 2 shows a transitional position between the positions shown in FIGS. 1 and 3. As such the vehicle 10 may be configured for use by a child, such as a child in the range of about 3 to about 6 years old, who may initially use the vehicle in the tricycle form, and who may then graduate to using the vehicle 10 in the bicycle form. In at least some embodiments, the conversion from one form to the other may be carried out without the use of tools, and may be relatively simple.

The vehicle 10 may include a frame 12, a front wheel 14 and a rear assembly 16. The frame 12 may have any suitable form for holding the front wheel 14 and the rear assembly 16. In the embodiment shown, the frame 12 may include a main portion 18, a stem 19, a handlebar 20 and a front fork 22 to which the front wheel 14 is rotatably mounted. The front fork 22 may be pivotally mounted to the main portion 18 of the frame 12 to permit steering of the vehicle 10 by the rider. A seat is also shown at 23 as being mounted to the frame 12, and may be adjustable in height.

The rear assembly 16 may include a first rear wheel support 24 and a second rear wheel support 26, each of which is movably mounted to the frame 12. The rear assembly 16 may further include a first rear wheel 28 and a second rear wheel 30, which are rotatably mounted to the first and second rear wheel supports 24 and 26 respectively. The rear assembly 16 is positionable in a first position, shown in FIG. 1, in which the first and second rear wheels 28 and 30 are substantially immediately adjacent one another, and a second position, shown in FIG. 3, in which the first and second rear wheels 28 and 30 are spaced apart from one another.

Each of the first and second rear wheels 28 and 30 has a mounted end 32 which is supported by the respective rear wheel support 24 or 26, and a free end 34 which is unsupported by the respective rear wheel support 24 or 26. As can be seen in FIGS. 1 and 3, the free ends 34 face each other when the rear assembly 16 is in the first position and face away from each other when the rear assembly 16 is in the second position. As can be seen in FIG. 1, when the rear assembly 16 is in the first position, the first and second rear wheel supports 24 and 26 support outboard sides only of the first and second rear wheels 28 and 30.

It will be further noted that each of the first and second rear wheels 28 and 30 has a selected surface contour 36 (FIG. 1). When the rear assembly 16 is in the first position the surface contours 36 extend laterally towards each other substantially without discontinuity so that the two rear wheels 28 and 30 together cooperate to act as a single rear wheel, and to substantially appear as a single rear wheel.

Figure 11:
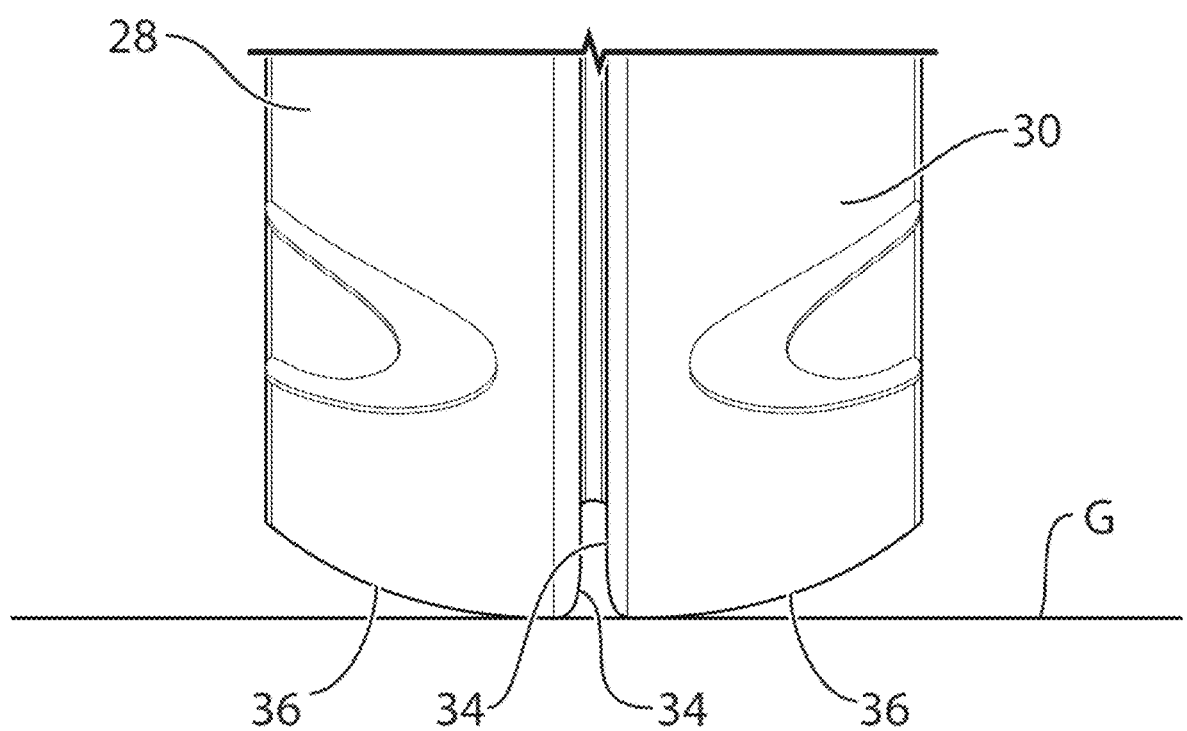
FIG. 11 is a magnified elevation view showing the rear wheels of the vehicle in a selected position.

In the embodiment shown, the surface contours 36 of the first and second rear wheels 28 and 30 are such that the first and second rear wheels 28 and 30 substantially only contact a ground surface (shown at G in FIG. 11) at the respective free ends. In other words, substantially immediately as each surface contour 36 extends away the free end 34 of the associated wheel 28 or 30 (i.e. towards the mounted end 32), the surface contour 36 extends upward, away from the ground surface G on which the wheel 28 or 30 sits). As a result, the vehicle 10 has a similar amount of lateral stability as compared to that of a typical bicycle.

To permit the free ends 34 to face each other when the rear assembly 16 is in the first position, each rear wheel 28 and 30 may be pivotably connected to the respective rear wheel support 24 or 26 for pivoting movement about a generally vertical wheel pivot axis A so as to permit the first and second rear wheels 28 and 30 to pivot between an inboard position (FIGS. 1 and 2) relative to the rear wheel supports 24 and 26, and an outboard position (FIG. 3) relative to the rear wheel supports 24 and 26.

Figure 4:
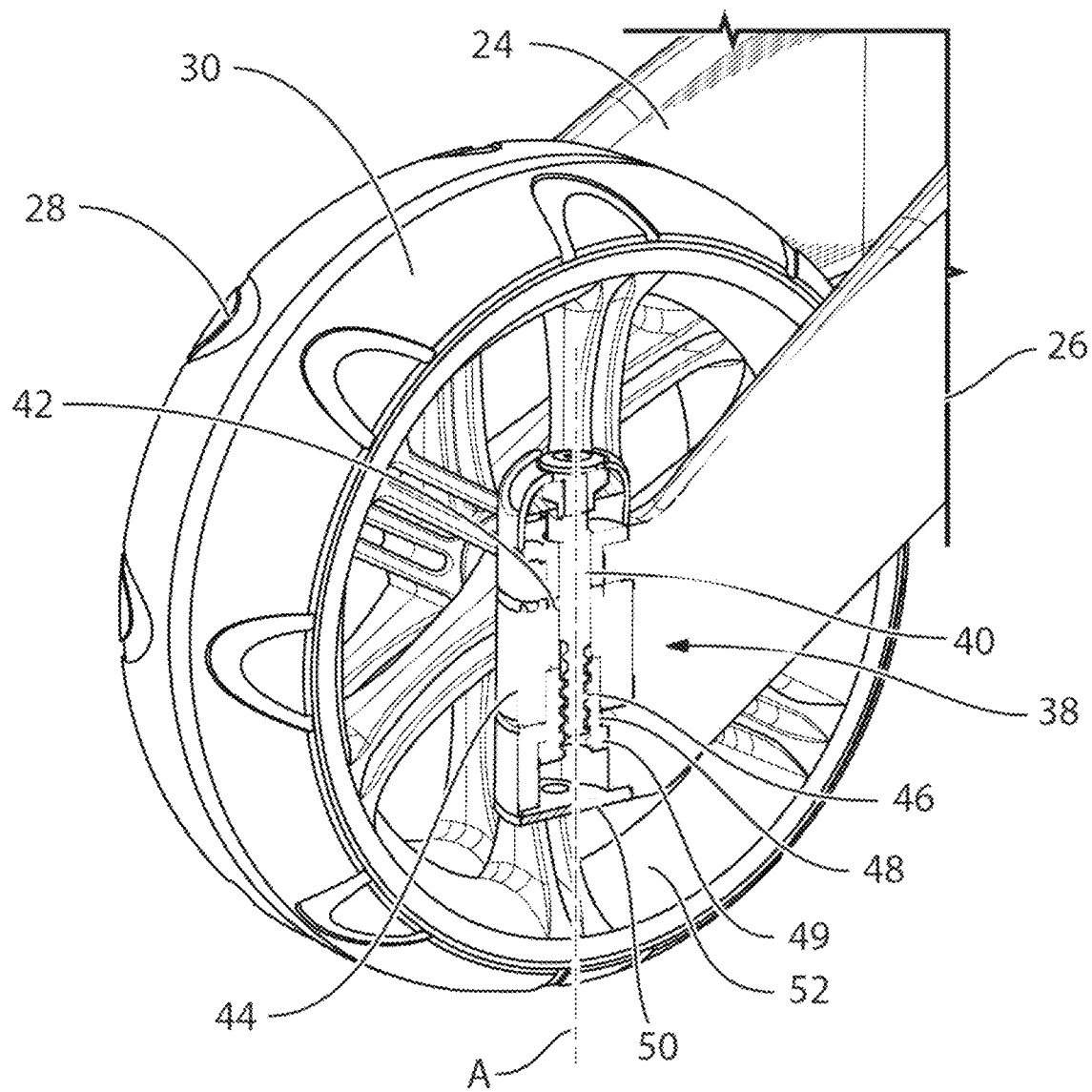
FIG. 4 is a sectional perspective view of a wheel locking mechanism for a rear wheel of the vehicle shown in FIG. 1.

Referring to FIG. 4, a locking mechanism 38 is provided for locking each rear wheel 28 and 30 in whichever position it is in. The locking mechanism 38 includes a hand knob 40 that engages a first shoulder 42 on a first hinge portion 44 on the rear wheel 28 or 30. (The locking mechanism 38 for the wheel 30 is shown in FIG. 4. However, the locking mechanism 38 for the wheel 28 may be substantially identical to the one for the wheel 30). The hand knob 40 has a first threaded portion 46 at one end which mates with a second threaded portion 48 on a clamping member 49. The clamping member 48 engages a second shoulder 50 on a second hinge portion 52 on the rearward end of the rear wheel support 24 or 26. (Wheel support 26 is shown in FIG. 4). Tightening of the hand knob 40 causes clamping of the hinge portions 44 and 52 together so as to frictionally lock the rear wheel 28 or 30 in position about the pivot axis A. Loosening of the hand knob 40 unclamps the hinge portions 44 and 52 thereby permitting the wheel 28 or 30 to be pivoted to a new position.

Referring to FIG. 1, the rear wheel supports 24 and 26 each have a forward end 54 that is pivotally mounted to the frame 12, while the rearward end, shown at 56, supports one of the first and second rear wheels 28 and 30, as described above. When the rear assembly 16 is in the first position (FIG. 1) the rear wheel supports 24 and 26 are pivoted to a proximate position in which the rear wheel supports 24 and 26 are proximate one another. When the rear assembly 16 is in the second position (FIG. 3) the rear wheel supports 24 and 26 are pivoted to a spaced apart position in which the rear wheel supports 24 and 26 are spaced apart from one another.

Figure 5:
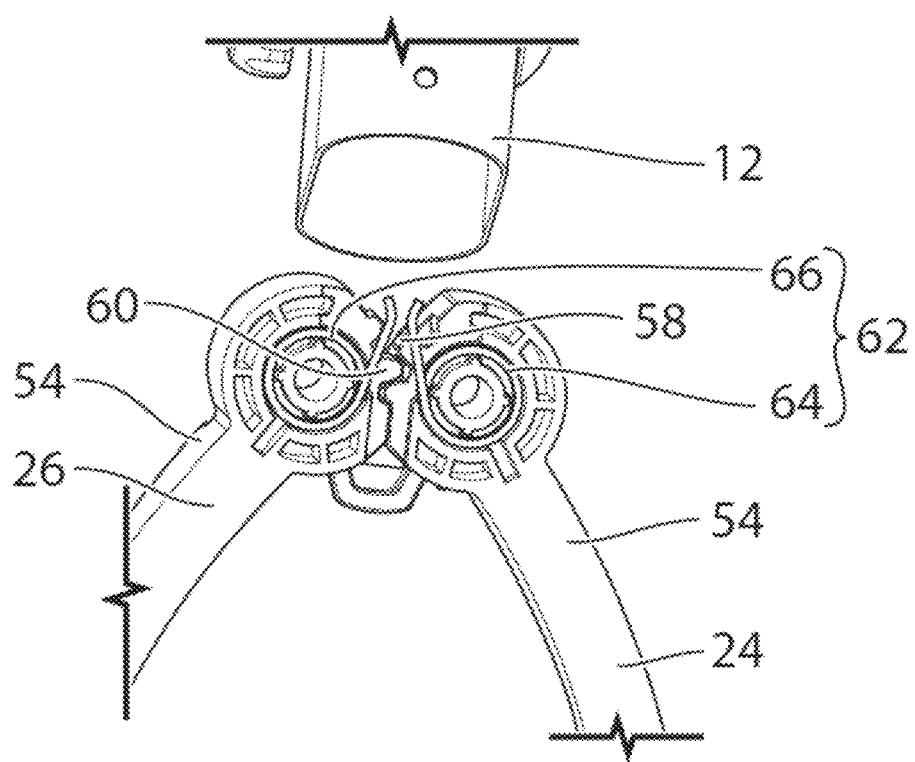
FIG. 5 is a perspective view of part of a rear assembly of the vehicle shown in FIG. 1.
Figure 6:
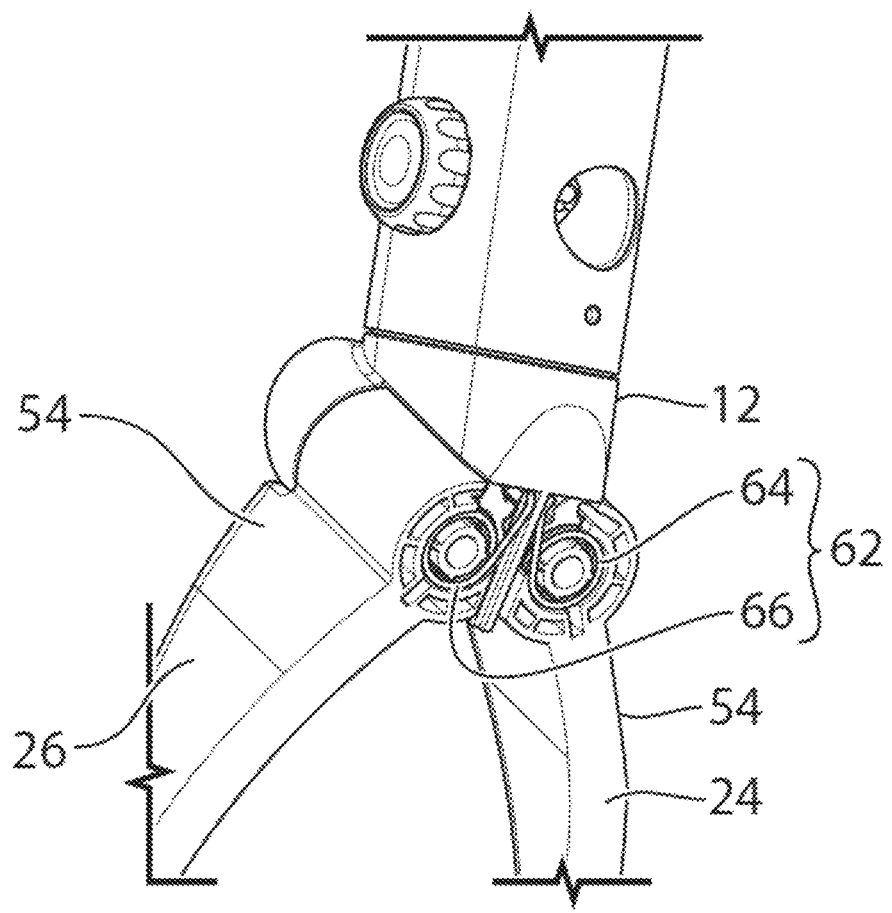
FIG. 6 is another perspective view of part of the rear assembly of the vehicle shown in FIG. 1.

With reference to FIG. 5, it is optionally possible for the first and second rear wheel supports 24 and 26 to each include gear teeth shown at 58 and 60 respectively which mesh together so that the first and second rear wheel supports 24 and 26 are synchronously joined together for synchronous movement between the proximate and spaced apart positions. In FIG. 5, selected elements from the frame are removed to more clearly show the gear teeth 58 and 60. With reference to FIGS. 5 and 6, a wheel support biasing structure shown at 62 may be provided for biasing the first and second rear wheel supports 24 and 26 in a selected direction, such as, towards each other. In the embodiment shown, the biasing structure 62 comprises first and second helical torsion springs 64 and 66 that act between the frame (as can be seen in FIG. 6) and the supports 24 and 26 respectively to urge the supports 24 and 26 towards the proximate position.

Figure 7:
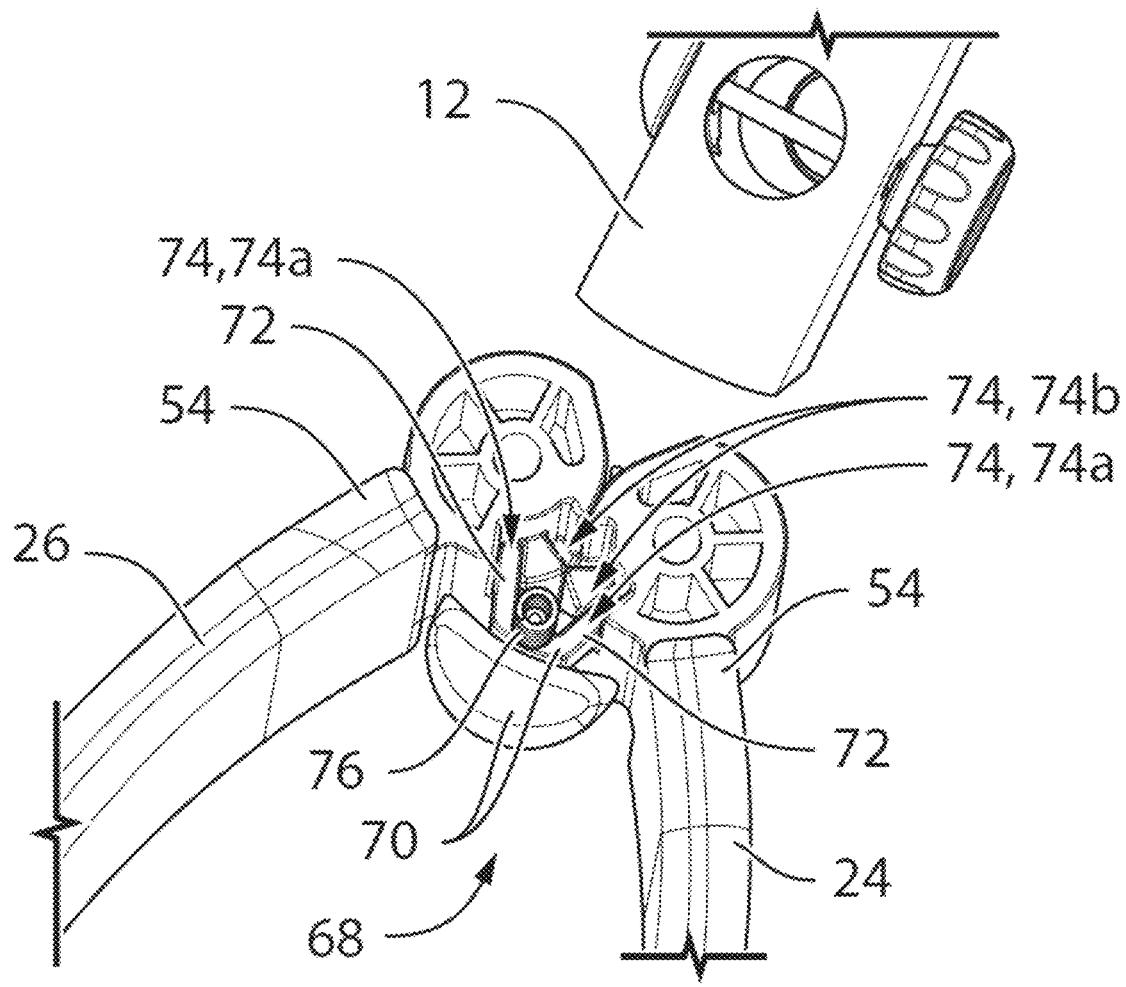
FIGS. 7 and 8 are perspective views of a wheel support locking mechanism for the rear assembly of the vehicle shown in FIG. 1.
Figure 8:
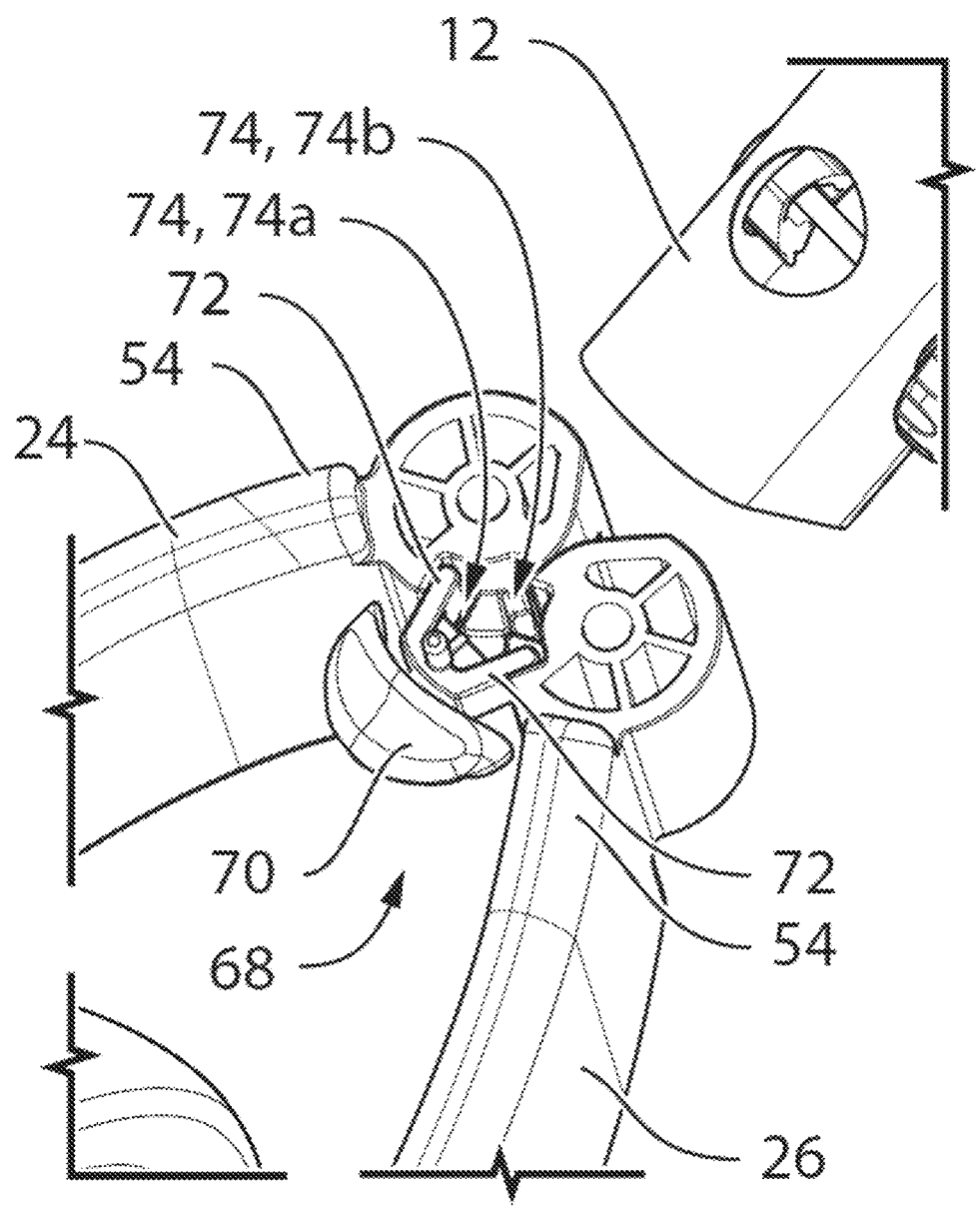

Referring to FIGS. 7 and 8, the vehicle 10 may further include a wheel support locking mechanism 68 configured for locking the rear wheel supports 24 and 26 in the proximate and spaced apart positions. It will be noted that elements of the frame 12 have been omitted from FIGS. 7 and 8 to more clearly show the components of the locking mechanism 68. The locking mechanism 68 may include a slider 70 that is movable between a locking position shown in FIG. 7 and an unlocking position shown in FIG. 8. In the locking position the tabs 72 on the slider 70 engage first slots 74 in the rear wheel supports 24 and 26 to prevent movement of the rear wheel supports 24 and 26 from whichever of the proximate and spaced apart positions they are in to the other of the proximate and spaced apart positions. In other words, the engagement of the tabs 72 with the first slots 74 locks the rear wheel supports 24 and 26 in position. In the unlocking position, the tabs 72 on the slider 70 clear the slots 74 (FIG. 8) so as to permit the rear wheel supports 24 and 26 to pivot between the proximate and spaced apart positions. In the embodiment shown, the rear wheel supports 24 and 26 each have two slots, 74a and 74b, wherein slot 74a is the slot engaged by tab 72 when the rear wheel support 24 or 26 is in the proximate position, and slot 74b is the slot engaged by tab 72 when the rear wheel support 24 or 26 is in the spaced apart position.

As shown in FIG. 7, a slider biasing member 76 is shown, which may be a compression spring that acts between the slider 70 and a portion of the frame 12 that is not shown. The biasing member 76 biases the slider towards the locking position.

Figure 9:
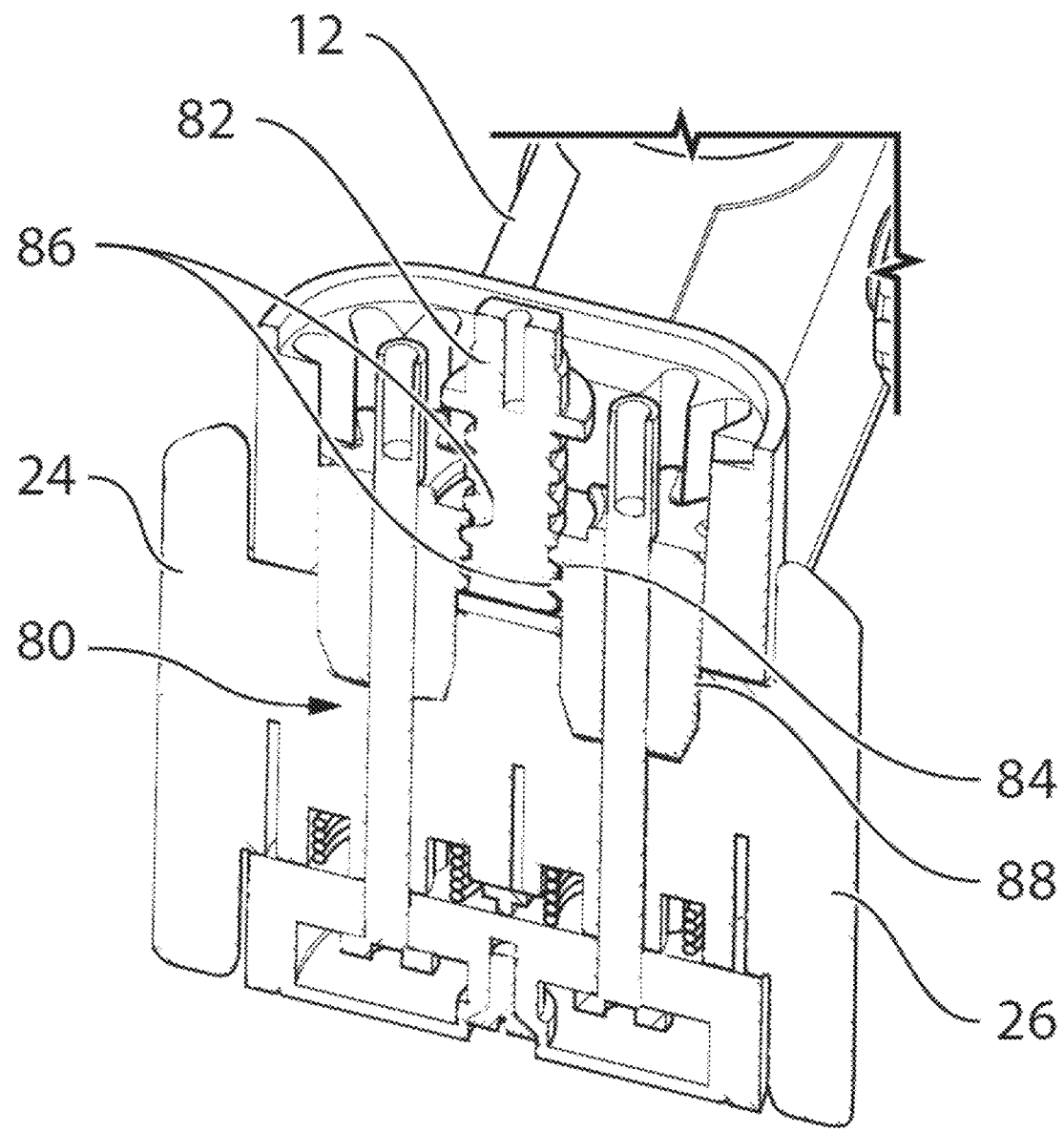
FIGS. 9 and 10 are perspective views of an alternative wheel support locking mechanism for the rear assembly of the vehicle shown in FIG. 1.
Figure 10:
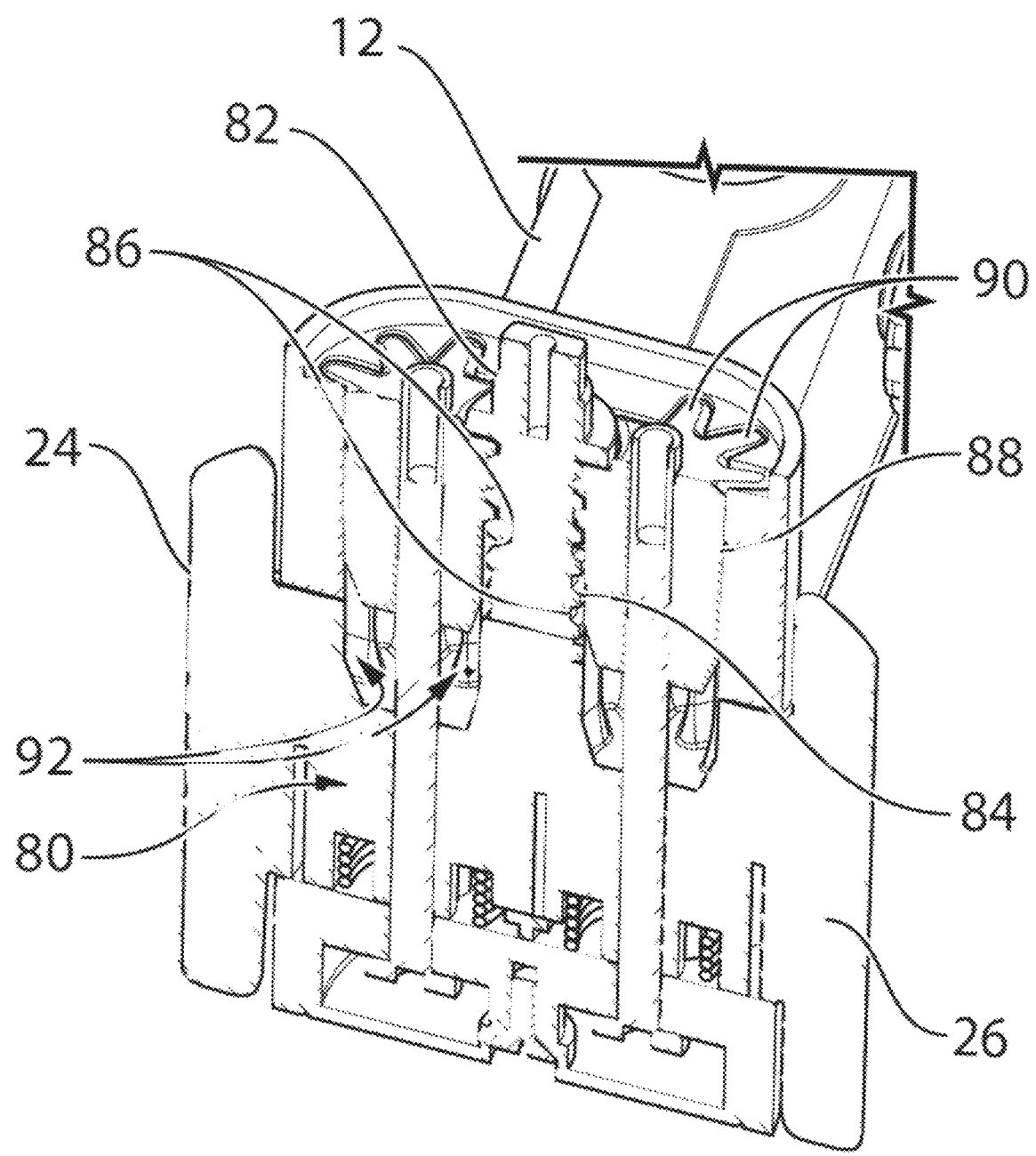

Reference is made to FIGS. 9 and 10, which show an alternative wheel support locking mechanism 80. The locking mechanism 80 includes a hand knob 82 (a portion of which is omitted in these figures) that has a first threaded portion 84 that is engageable with a second threaded portion 86 on a slider 88. The slider 88 includes a plurality of tabs 90. The slider 88 is movable between a locking position (FIG. 9) and an unlocking position (FIG. 10). In the locking position the tabs 90 on the slider 88 engage slots 92 (which are more clearly shown in FIG. 10) in the rear wheel supports 24 and 26 to prevent movement of the rear wheel supports 24 and 26 from whichever of the proximate and spaced apart positions they are in to the other of the proximate and spaced apart positions. In the unlocking position, the tabs 90 on the slider 88 clear the slots 92 (FIG. 10) so as to permit the rear wheel supports 24 and 26 to pivot between the proximate and spaced apart positions. Rotation of the hand knob 82 drives the linear movement of the slider 88 between the locking and unlocking positions. Because there are a plurality of the tabs and slots 90 and 92 about the slider 88 and the in the associated portion of the frame, they may engage each other in a plurality of positions including the proximal position and the spaced apart position.

Referring to FIG. 1, a set of pedals 15 is operatively connected to the front wheel 14 for use in operating the vehicle 10. It is alternatively possible for the vehicle 10 to not have pedals and to be a running vehicle.

By providing the structure shown, conversion between a tricycle mode and a bicycle mode is relatively easy, requires no tools and can be carried out quickly. Furthermore, no components need to be removed and stored when operating the vehicle as a bicycle, as is the case with some proposed vehicles of the prior art.

While it has been shown that in the second position of the rear assembly 16 the rear wheels 28 and 30 are outboard of the supports 24 and 26, it is possible to configure the supports 24 and 26 such that, when the supports 24 and 26 are spaced apart but the rear wheels 28 and 30 are inboard of the supports 24 and 26 the rear wheels 28 and 30 would be parallel to one another and to be straight so as to permit the vehicle 10 to roll, thereby permitting the rear wheels 28 and 30 to be spaced apart from one another but to remain inboard of the supports 24 and 26 in the second position of the rear assembly 16.

While it has been shown for the rear wheels 28 and 30 to be supported on one side only by the supports 24 and 26, so as to permit the wheels 28 and 30 to be positioned very close to one another when the rear assembly 16 is in the first position (FIG. 1), it is nonetheless optionally possible to provide rear wheel supports that support the rear wheels 28 and 30 from both sides and for the rear wheel supports to move between a spaced apart position and a proximate position. Some means of adjustability may be provided to the rear wheels 28 and 30 to adjust their orientation to permit them to remain straight (i.e. pointing forward) in either position of the supports 24 and 26.

While the supports 24 and 26 are shown to pivot relative to the frame 12 between the proximate and spaced apart positions, other means of movably mounting the supports 24 and 26 to the frame 12 are possible. For example, the supports 24 and 26 may be laterally slidable along a laterally extending bar on the frame 12 so as to permit them to slide laterally between a proximate position in which the supports 24 and 26 are proximate one another and a spaced apart position in which the supports 24 and 26 are spaced apart from one another.

While the disclosure above relates to an embodiment in which the rear wheels of the vehicle can be brought together or spaced apart, the concept is more broadly applicable to any vehicle wherein two wheels can be brought together or spaced apart so as to reconfigure the vehicle. In such an embodiment, the frame may be said to have a first end and a second end. The front wheel 14 may more broadly be referred to as a first end wheel that is provided at the first end of the frame, and the rear assembly may more broadly be referred to as a second end assembly that is provided at the second end of the frame. The second end assembly includes a left second end wheel support and a right second end wheel support (in the embodiment shown these are the wheel supports 24 and 26 respectively). Each of the wheel supports is movably mounted to the frame. The second end assembly further includes a left second end wheel (in the embodiment shown this is the wheel 28) and a right second end wheel (in the embodiment shown this is the wheel 30). The left and right second end wheels are rotatably mounted to the left and right second end wheel supports respectively. The second end assembly is positionable in a first position in which the left and right second end wheels are substantially immediately adjacent one another so as to operate as a single second end wheel, and a second position in which the left and right second end wheels are spaced apart from one another.

Reference is made to FIGS. 12*a*-16, which show a vehicle 100. The vehicle 100, like the vehicle 10 may be convertible between a first form (also referred to as a first position) in which it is configured as a bicycle (FIG. 12*a*) and a second form (also referred to as a second position) in which it is configured as a tricycle (FIG. 12*b*). Optionally, the vehicle 100 may further be convertible from either the first or second forms (positions) to a third form or third position, in which the vehicle is configured as a scooter shown in FIG. 12*c*.

Figure 12A:
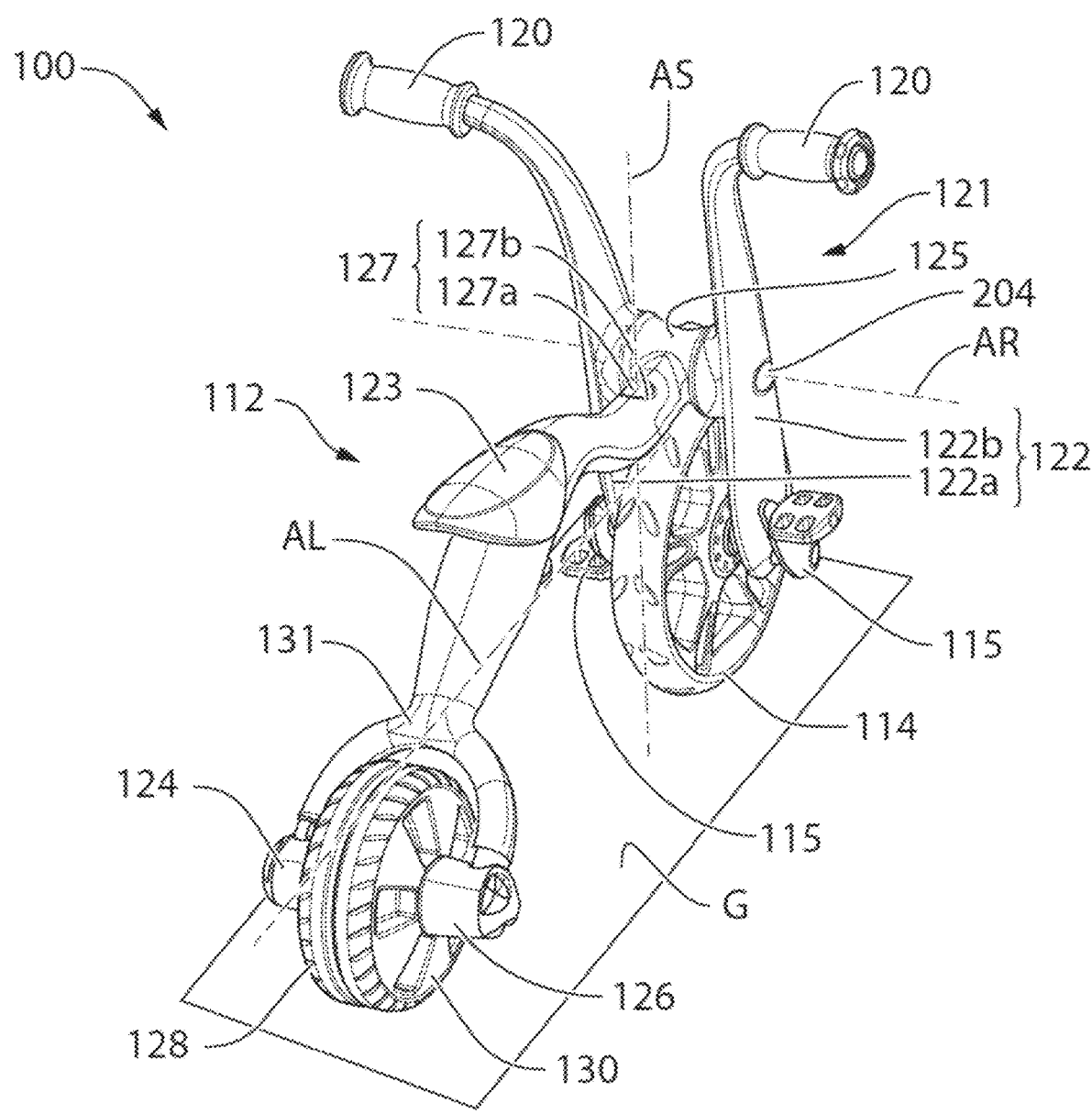
FIG. 12a is a perspective view of another embodiment of the vehicle, in a first position wherein the vehicle is a bicycle.

The vehicle 100 may be similar to the vehicle 10 in that the vehicle 100 includes a frame 112, a front wheel 114, and a rear assembly 116. The frame 112 may have any suitable form for holding the front wheel 114 and the rear assembly 116. In the embodiment shown, the frame 112 may include a main portion 118, and a front wheel support 121 that is pivotably connected to the main portion 118. The front wheel support 121 includes a front wheel support body 125 that is pivotably connected to the main portion 118 of the frame 112 (e.g. by means of a pivot connection 127 formed with stub shafts 127*a* on the main portion 118 of the frame 112, which engage apertures 127*b* on the front wheel support body 125), for pivoting movement about a steering pivot axis AS. A pair of handlebars 120 is connected to the front wheel support body 123. The handlebars 120 extend down past the support body 125 to make up the arms 122*a* and 122*b* of the front fork shown at 122 (FIG. 12*a*). The front wheel 114 is rotatably supported by the front fork 122.

A seat, shown at 123, is mounted to the frame 112, and may be adjustable in height.

Referring to FIG. 1, a set of pedals 115 is operatively connected to the front wheel 114 for use in operating the vehicle 100. It is alternatively possible for the vehicle 10 to not have pedals and to be a running vehicle (e.g. a balance bike).

The rear assembly 116 may include a rear fork 131 that is integral with the frame 112, and more specifically with the main portion 118 of the frame 112. A first rear wheel support 124 and a second rear wheel support 126 are each movably mounted to the frame 112. The rear assembly 116 may further include a first rear wheel 128 and a second rear wheel 130, which are rotatably mounted to the first and second rear wheel supports 124 and 126 respectively. With respect to the conversion between the bicycle form and the tricycle form, the rear assembly 116 is positionable in a first position, shown in FIG. 12*a*, in which the first and second rear wheels 128 and 130 are substantially immediately adjacent one another, and a second position, shown in FIG. 12*b*, in which the first and second rear wheels 128 and 130 are spaced apart from one another.

Figure 13A:
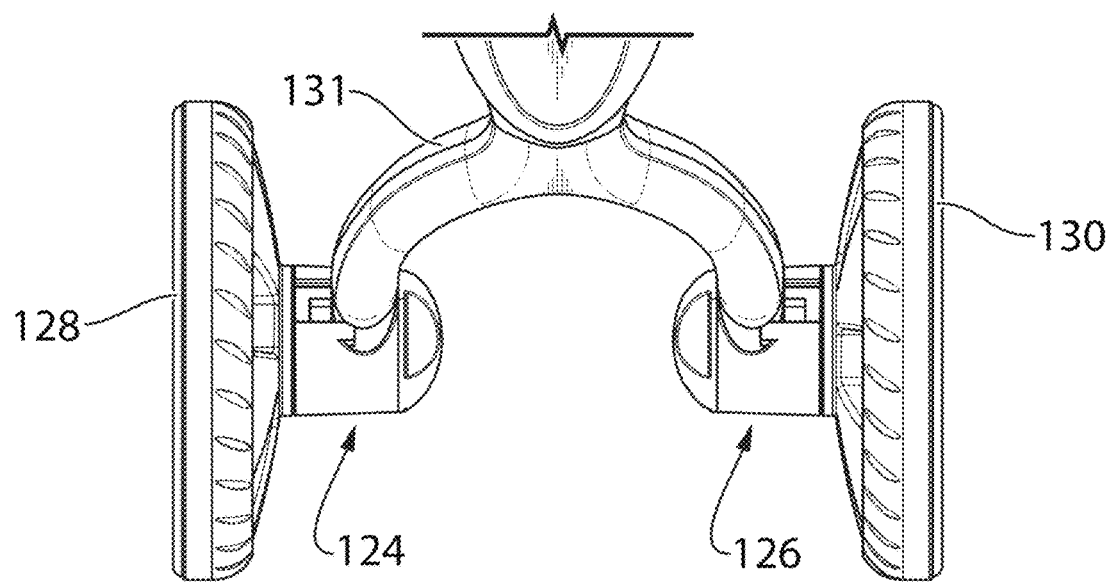
Figure 13B:
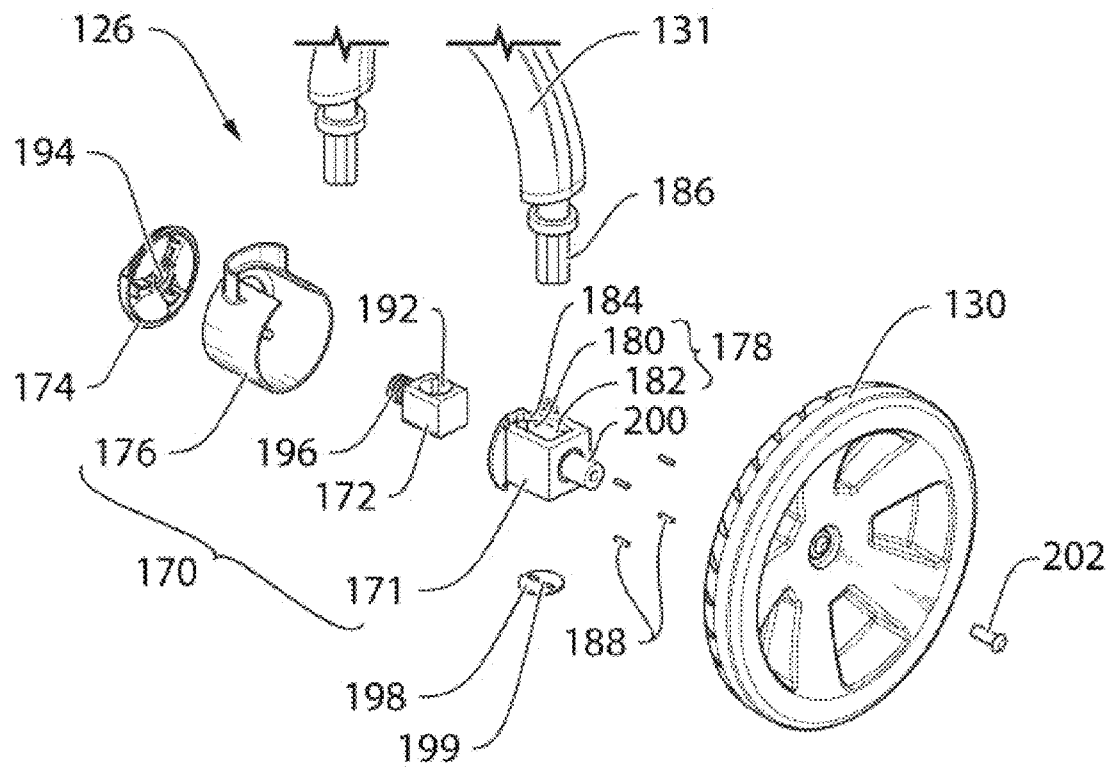
FIGS. 13b and 13c are exploded views of a wheel support that is used for supporting a rear wheel of the vehicle shown in FIGS. 12a-12c.
Figure 13C:
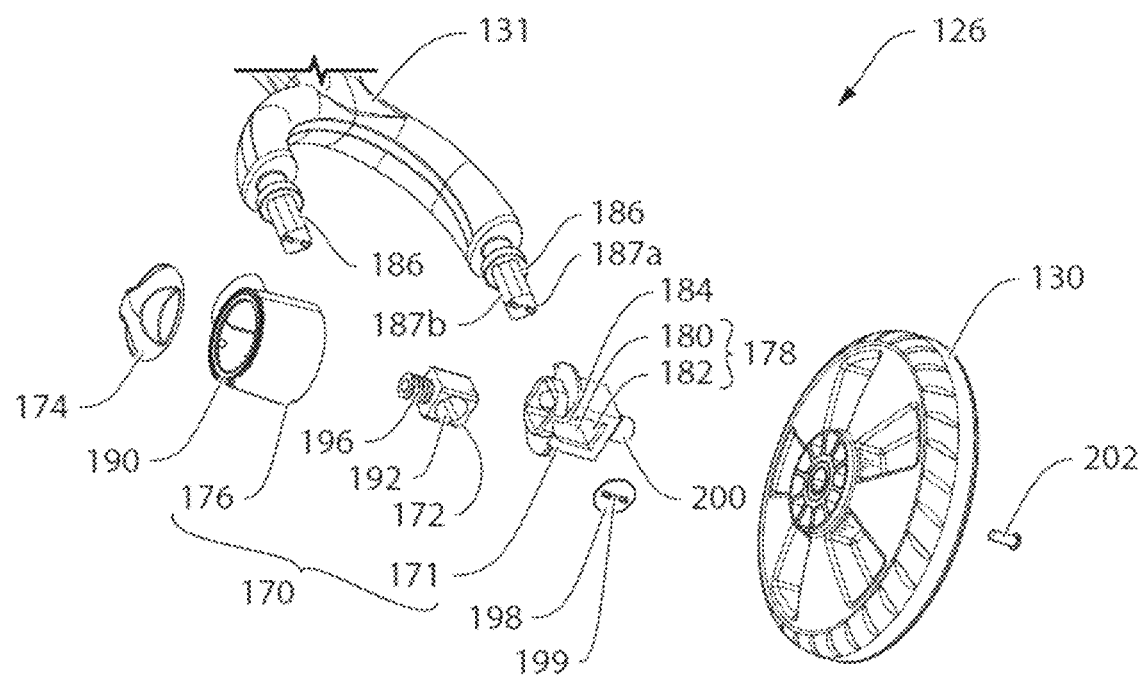

For the purpose of describing the rear wheel supports 124 and 126, reference is made to FIG. 13*a*, which shows the rear assembly 114 for the vehicle 100 in the position for use of the vehicle 100 as a tricycle. FIGS. 13*b*-13*c* are exploded views of the second rear wheel support 126, however it will be understood that the first rear wheel support 124 may be substantially identical to the second rear wheel support 126.

The rear wheel support 126 includes a pivot locking member 170, a traveler 172, and a driver 174. The pivot locking member 170 includes a first pivot shaft receiving aperture 178 that has a locking region 180 and a non-locking region 182. In the locking region 180, the aperture 178 has an aperture locking feature 184 that is configured to lockingly engage the surface of a wheel pivot shaft 186 provided on each arm of the rear fork 131. In the non-locking region 182, the aperture does not lock rotationally to the wheel pivot shaft 186 and is therefore free to rotate about the wheel pivot shaft 186. As more clearly seen in FIG. 13*c*, the wheel pivot shaft 186 has at least a first pivot shaft locking feature 187*a* at a first angular position, and a second pivot shaft locking feature 187*b* at a second angular position. In the embodiment shown, each of the first and second pivot shaft locking features 187*a* and 187*b* is made up of two flat faces and the two pivot shaft locking features 187*a* and 187*b* are positioned 180 degrees apart on the wheel pivot shaft 186, providing a generally diamond-shaped profile to the wheel pivot shaft 186. When either pivot shaft locking feature 187*a* or 187*b* is abutted snugly with the aperture locking feature 184 in the locking region 180 of the aperture 178 (FIG. 14*a*, for example), the pivot locking member 170 is fixed in either a first, or a second selected angular position, respectively, on the wheel pivot shaft 186.

The pivot locking member 170 optionally is made up of a main portion 171 and a shell 176 that is connected fixedly to the main portion 171 (e.g. via mechanical fasteners 188 shown in FIG. 13*b*). The shell 176 may have thereon an abutment driver abutment surface 190 that engages the driver 174.

The traveler 172 has a second pivot shaft receiving aperture 192 therein for pivotably receiving the pivot shaft 186. In other words, the aperture 192 is sized to permit pivoting of the traveler 172 about the pivot shaft 186. The traveler 172 is slidably connected to the pivot locking member 170 for movement along a longitudinal axis of the first pivot shaft receiving aperture 178, so as to bring the wheel pivot shaft 186 between the locking and non-locking regions 180 and 182 of the aperture 178.

The driver 174 is operatively connected to the traveler 172. In the example shown in FIGS. 13*b* and 13*c*, the driver 174 has a threaded aperture 194 that receives a threaded projection 196 on the traveler 172. By turning the driver 174 in one rotational direction or another, it can control how far out the traveler 172 projects from the driver 174. In a first position shown in FIG. 14*a*, the driver 174 retains the traveler 172 in a locking position where the pivot locking member 170 is clamped with the pivot shaft 186 in abutment with aperture locking feature 184 in the locking region 180 of the aperture 178. As a result, pivoting of the wheel support 126 about the pivot shaft 186 is prevented. Rotation of the driver 174 to a second position, shown in FIG. 14*b*, drives the traveler 172 away by a selected amount from the driver 172, so that there is a larger gap between the body of the traveler 172 and the driver 174 than there is in the first position. As a result, there is room to move the pivot locking member 170 and the pivot shaft 186 relative to one another to bring the pivot shaft 186 out from the locking region 180 into the non-locking region 182 of the aperture 178 as shown in FIG. 14*c*.

The pivot locking member 170 is held on the pivot shaft 186 by means of a locking flange 198 and an associated fastener 199 for mounting the flange 198 to the end of an associated arm of the fork 131.

The pivot locking member 170 includes a shaft 200 that rotatably supports the wheel 130. A fastener 202 retains the wheel 130 on the shaft 200.

Figure 12B:
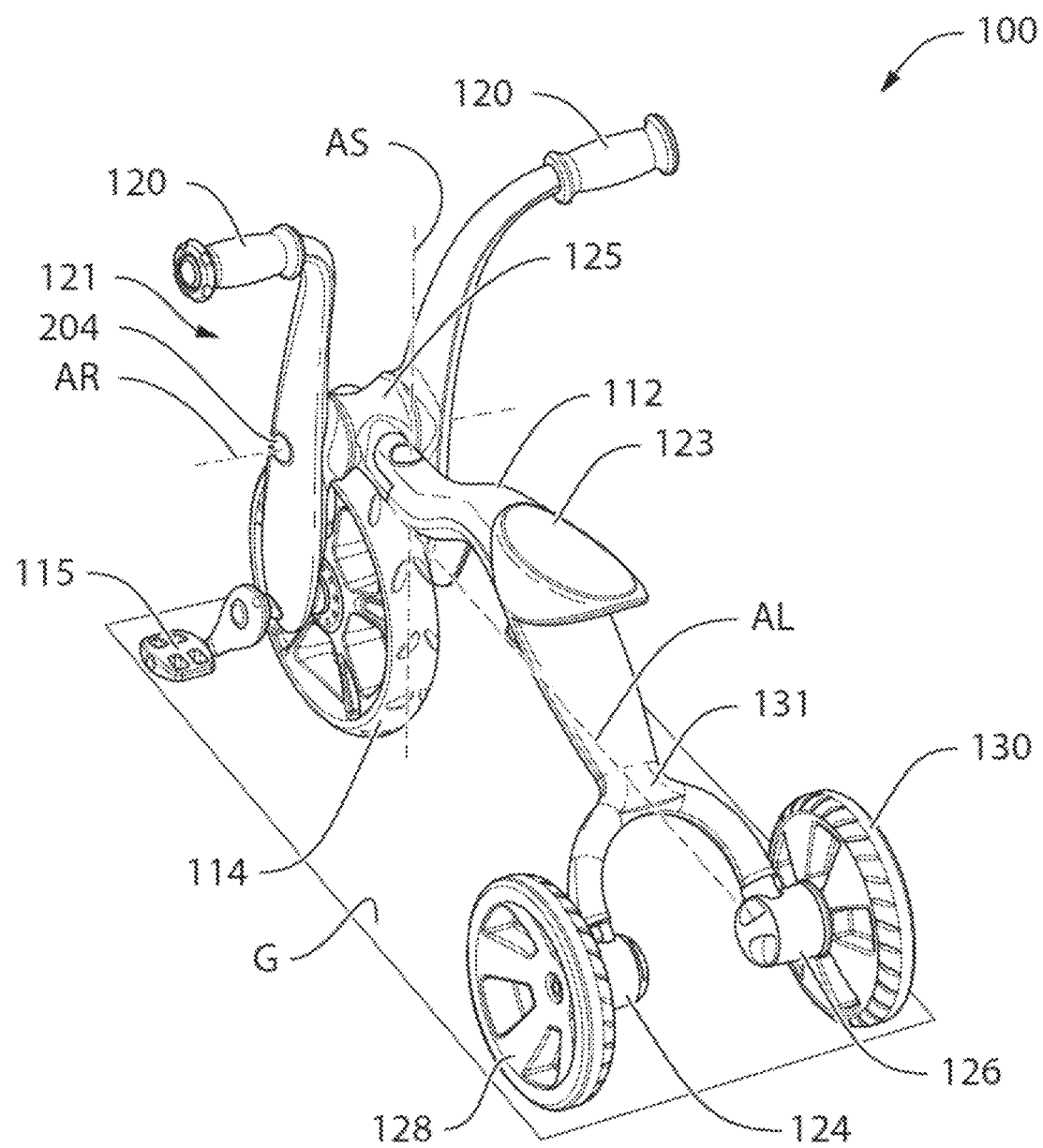
FIG. 12b is a perspective view of the embodiment of the vehicle shown in FIG. 12a, in a second position wherein the vehicle is a tricycle.
Figure 14A:
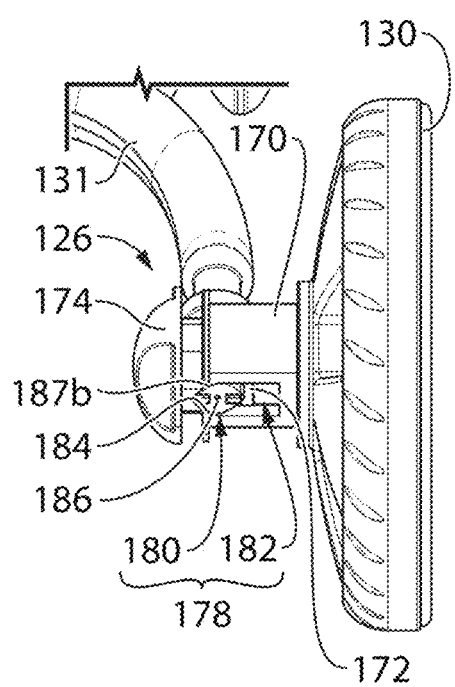
FIGS. 14a-14g illustrate the movement of the wheel support to move the vehicle between the position shown in FIG. 12a and the position shown in FIG. 12b.
Figure 14B:
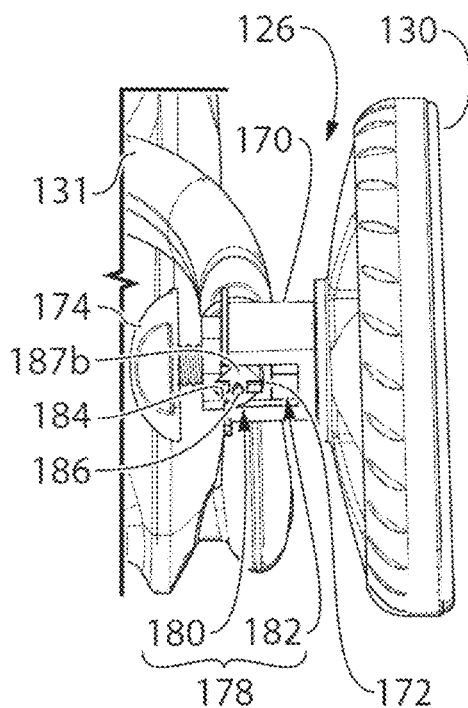
Figure 14C:
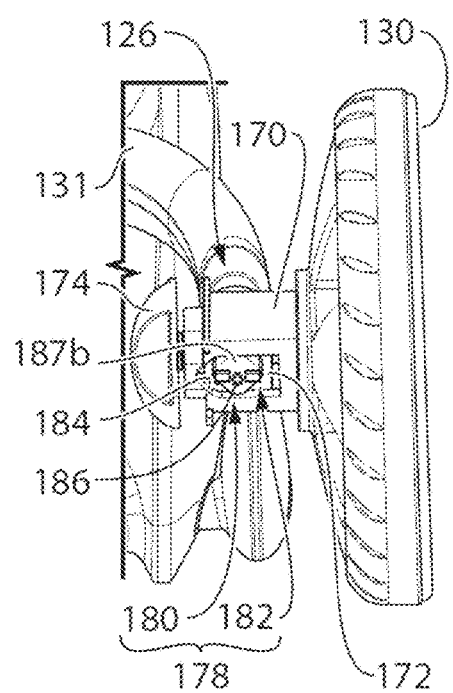
Figure 14D:
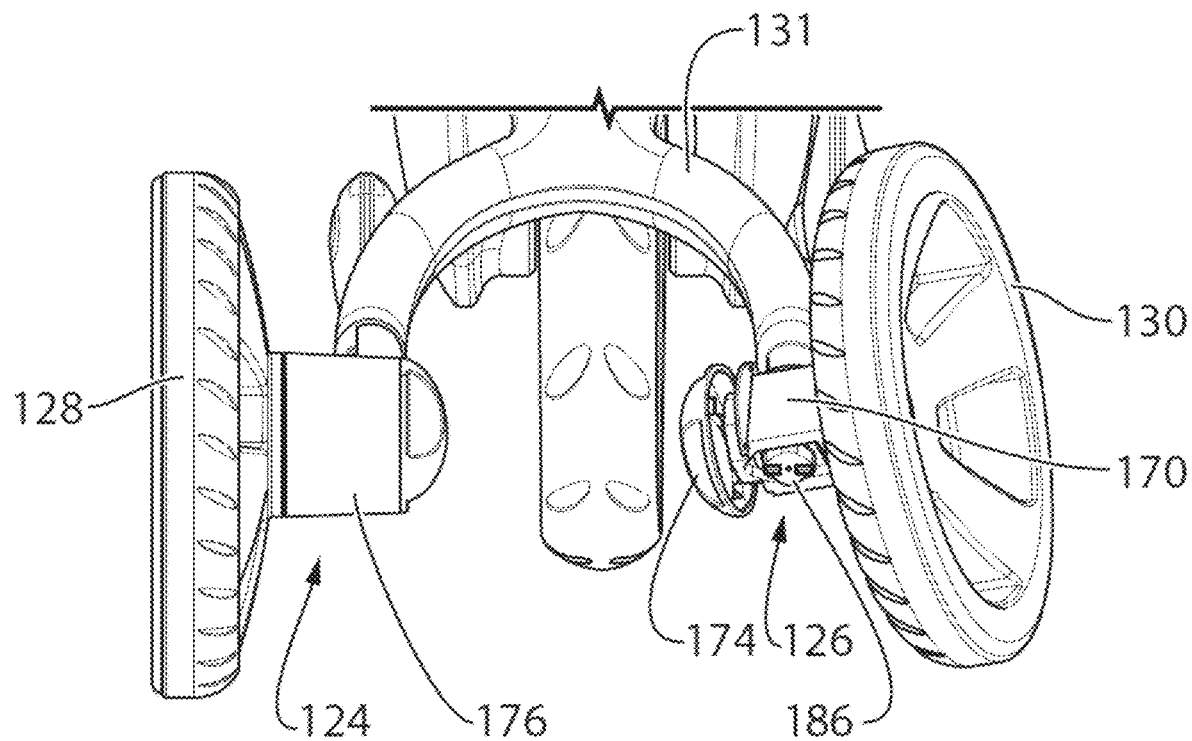
Figure 14E:
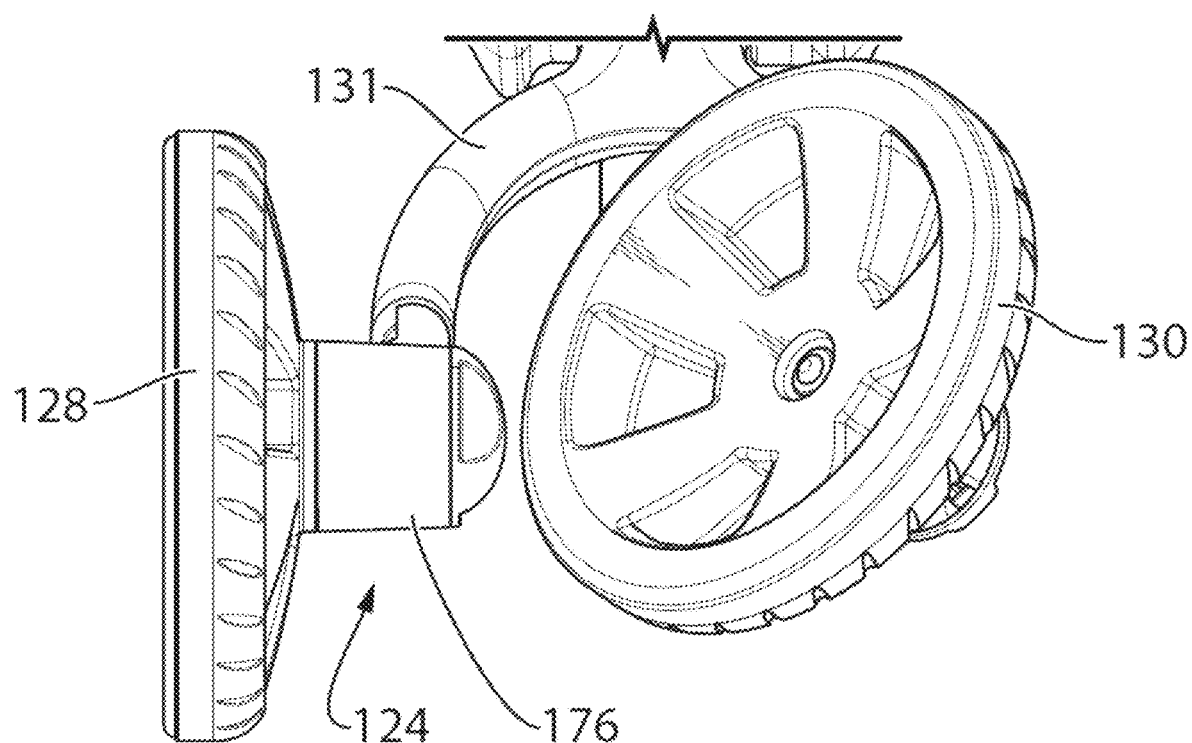
Figure 14F:
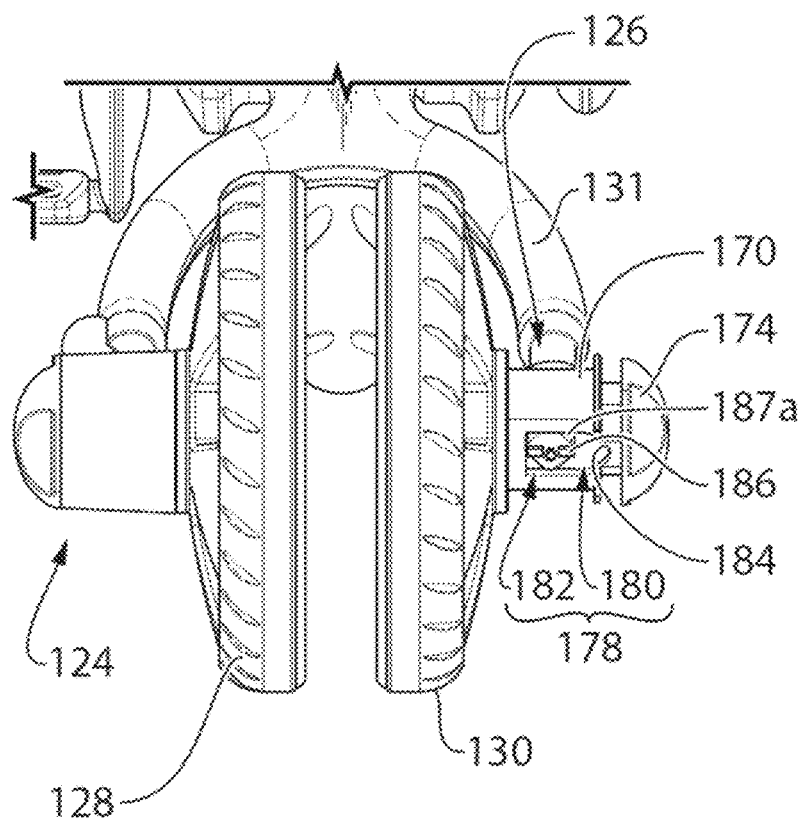
Figure 14G:
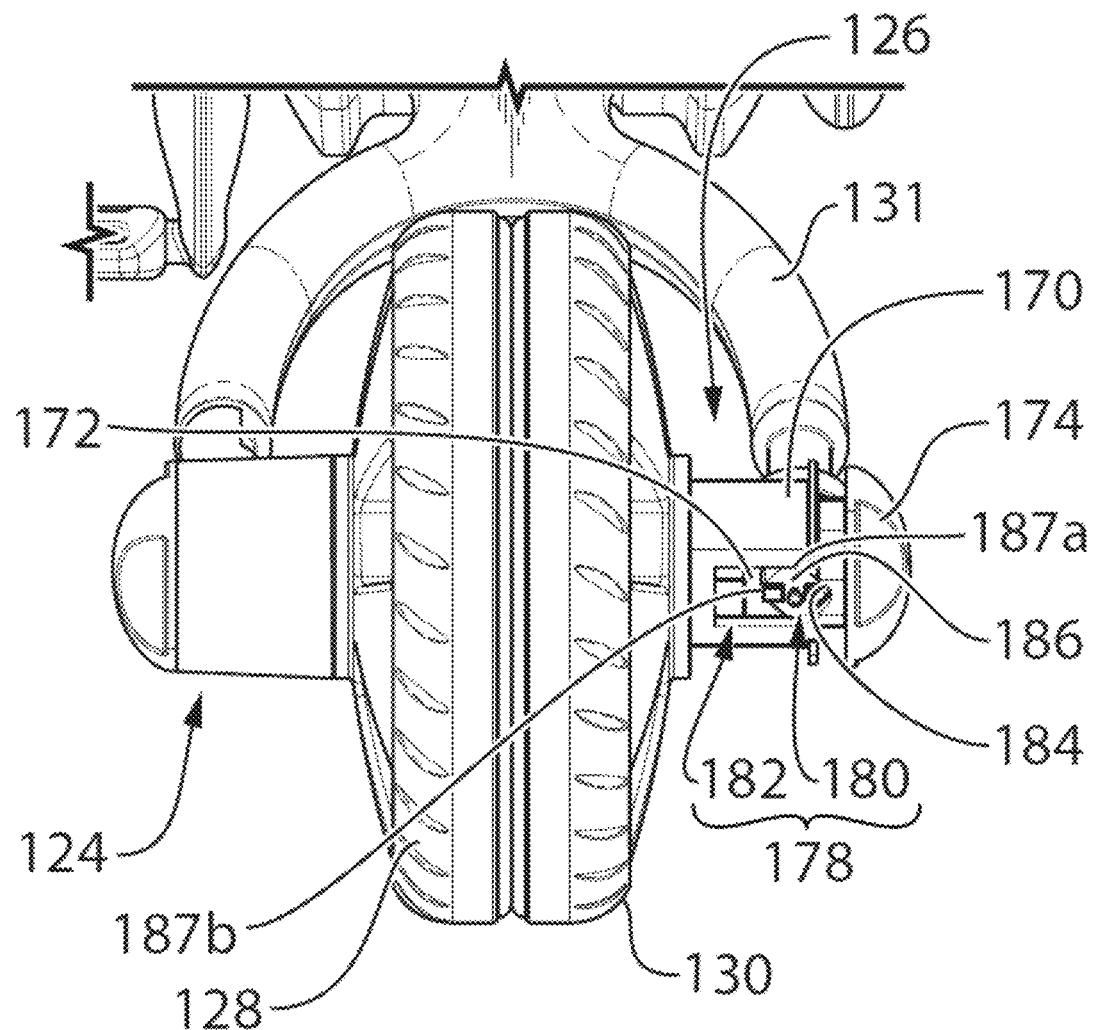

FIGS. 14a-14g illustrate the transition between the positions of the rear assembly shown in FIGS. 12b and 12a. As described above, FIG. 14a (which omits the shell 176 so as not to obscure the components inside the shell 176), shows the wheel 130 locked in the position to be spaced apart from the opposing rear wheel 128 (FIG. 13a) so that, for example, the vehicle 100 can be used as a tricycle as shown in FIG. 12b. In the position shown in FIG. 14a, the pivot shaft locking feature 187b is engaged with the aperture locking feature 184. FIG. 14b illustrates the rotation of the driver 174 to permit release of the pivot shaft 186 from the locking region 180 of the aperture 178. FIG. 14c illustrates the movement of the pivot shaft 186 into the non-locking region 182 of the aperture 178. FIG. 14d illustrates initiation of pivoting of the wheel support 126 and the wheel 130 about the pivot shaft 186. FIG. 14e illustrates further pivoting of the wheel support 126 and the wheel 130 about the pivot shaft 186. FIG. 14f illustrates pivoting of the wheel support 126 and the wheel 130 about the pivot shaft 186 to a pre-locking position in which the wheel support 126 is oriented such that desired locking feature (in this case the first pivot shaft locking feature 187a) faces the aperture locking feature 184. FIG. 14f shows both wheels 128 and 130 having been pivoted to the pre-locking position related to the first position. When in the pre-locking position shown in FIG. 14f, rotation of the driver 184 in the tightening direction would drive the locking of the wheel support 126 to the pivot shaft 186 in the first position in which the wheel 130 faces the opposing rear wheel 128, as shown in FIG. 14g. FIG. 14g shows both wheels 128 and 130 having been pivoted and locked in the first position such that the wheels 128 and 130 face each other.

Movement of the wheel 130 from the first position (FIG. 12a and FIG. 14g) to the second position (FIG. 12b and FIG. 14a) entails essentially a reverse of the movements carried out when moving the wheel 130 from the second position to the first position. In other words, the driver 174 would be loosened relative to the traveler 172; the pivot locking member 170 would be moved relative to the pivot shaft 186 to bring the pivot shaft 186 out of the locking region 180 of the aperture 178 and into the non-locking region 182 of the aperture 178; the wheel support 126 and the wheel 130 would be pivoted about the pivot shaft 186 ultimately bringing the wheel support and wheel 130 to a pre-locking position shown in FIG. 14b or 14c in which the second locking feature 187b on the pivot shaft 186 faces toward the aperture locking feature 184; and finally the driver 174 would then be tightened so as to lock the wheel support 126 and the wheel 130 in the second position as shown in FIG. 14a.

Figure 12C:
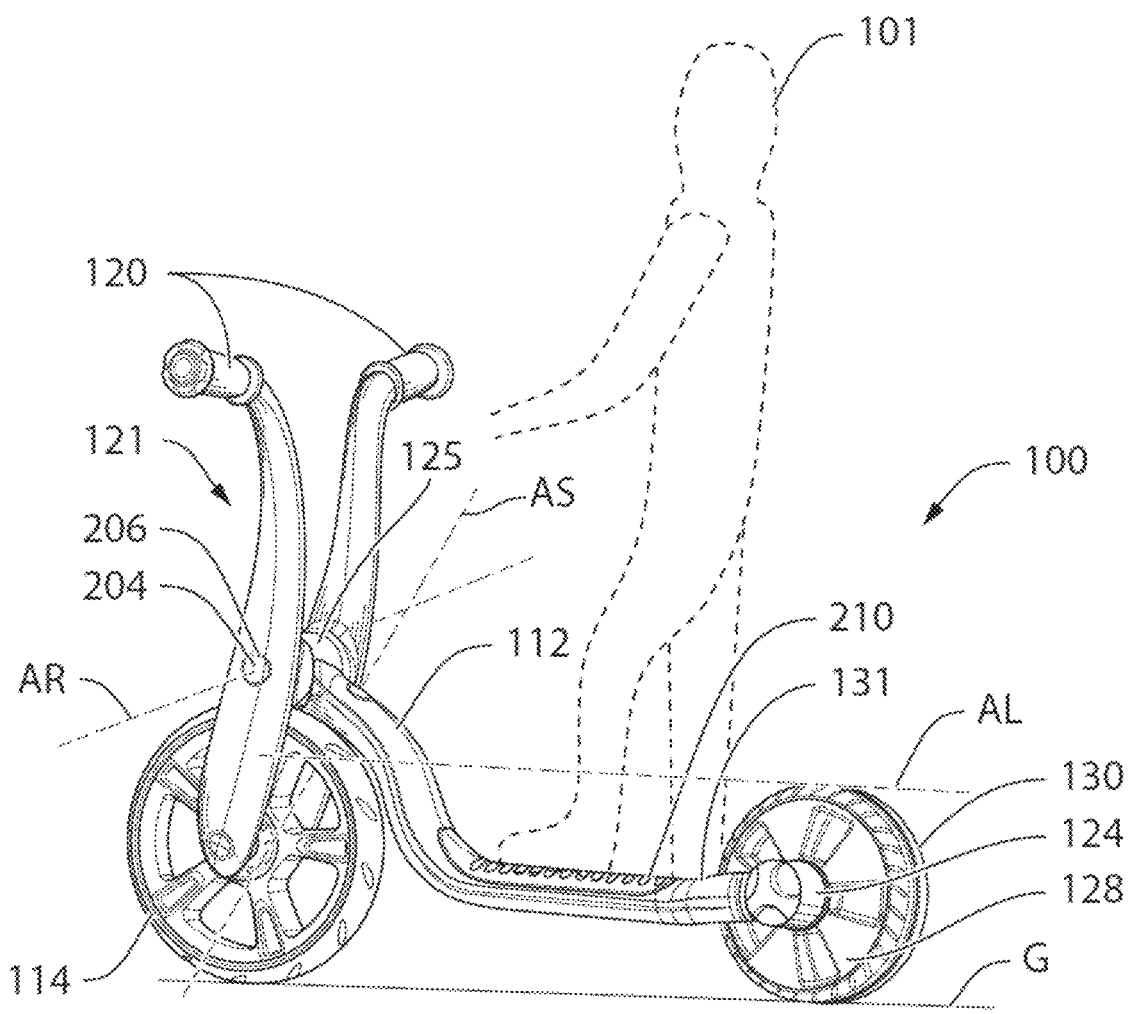
FIG. 12c is a perspective view of the embodiment of the vehicle shown in FIG. 12a, in a second position wherein the vehicle is a scooter.

Conversion of the vehicle 100 from the position shown in FIG. 12a to the position shown in FIG. 12c is described below. To carry out this conversion, the frame 112 may be pivotable relative to the front wheel support about a reconfiguration axis AR (FIG. 12c) that extends transversely (i.e. laterally) relative to a longitudinal axis of the vehicle 100, shown at AL. The longitudinal axis AL extends in a direction of travel of the vehicle 100 when all the wheels 114, 128 and 130 are straight (i.e. when the front wheel 14 is co-planar with the frame 112).

From the position shown in FIG. 12a, a first portion of the frame 112 including the main frame portion 118 and the front wheel support body 125 pivot upward about the reconfiguration axis AR, relative to a second portion of the frame 112 (in this example, relative to the front fork 122 and handlebars 120). To achieve this, the front wheel support body 125 may include first and second stub shafts 204 which are rotatably supported in fork apertures 206 in the first and second front fork arms 122a and 122b. The stub shafts 204 are shown in FIGS. 12a-12c and 16a and 16b. The apertures 206 are identified in FIGS. 12c, 16a and 16b.

In some embodiments a different portion of the frame 112 may pivot about the axis AR. For example, the front wheel support body 125 may be fixedly connected to the fork members 122a and 122b and may therefore remain stationary and centered on axis AR, and a first portion of the frame 112 comprising the main frame portion 118 and the rear assembly 116 may be rotatably supported on the front wheel support body 125 via rings, so as to permit this first portion of the frame 112 to be rotatable about the front wheel support body 125 (and about axis AR).

Figure 16A:
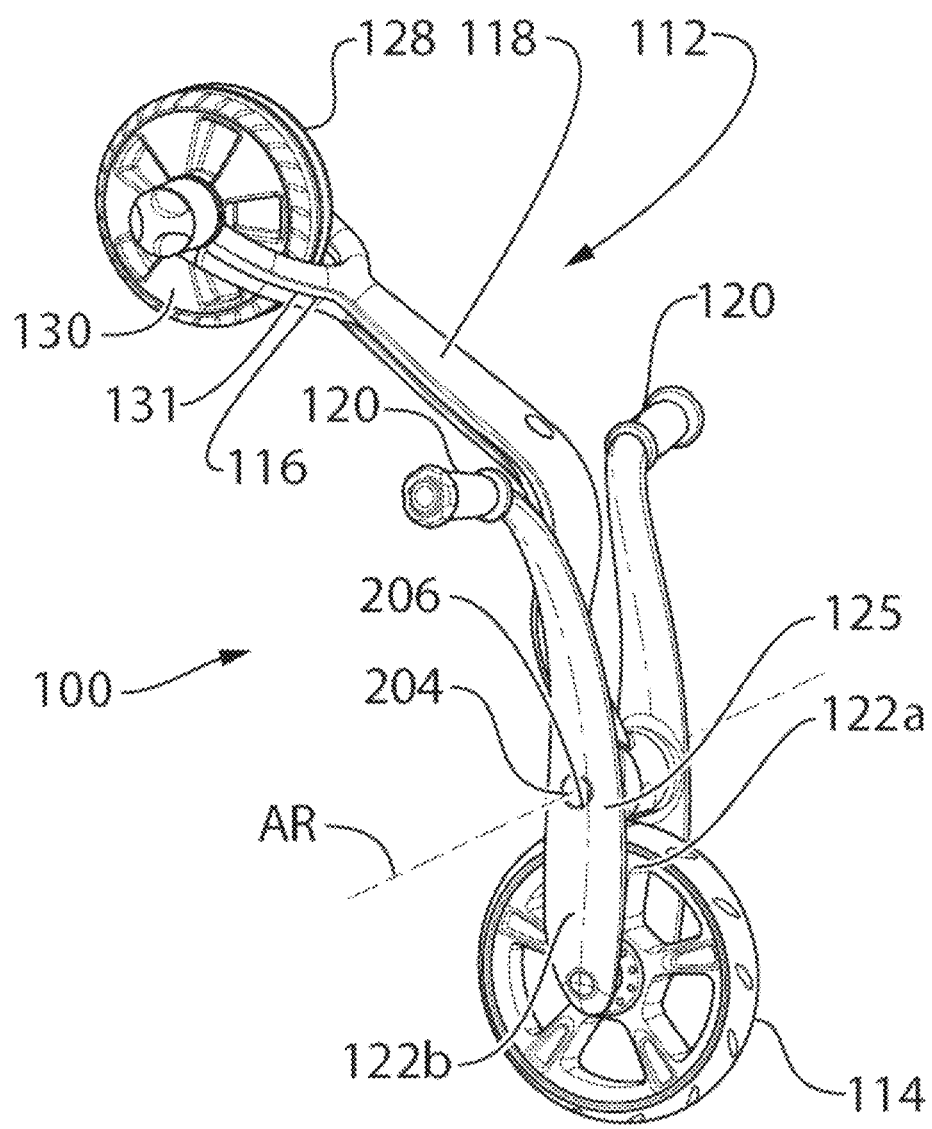
FIGS. 16a and 16b show intermediate positions during movement of the vehicle between a position shown in FIG. 12c and one of the positions shown in FIG. 12a or 12b.
Figure 16B:
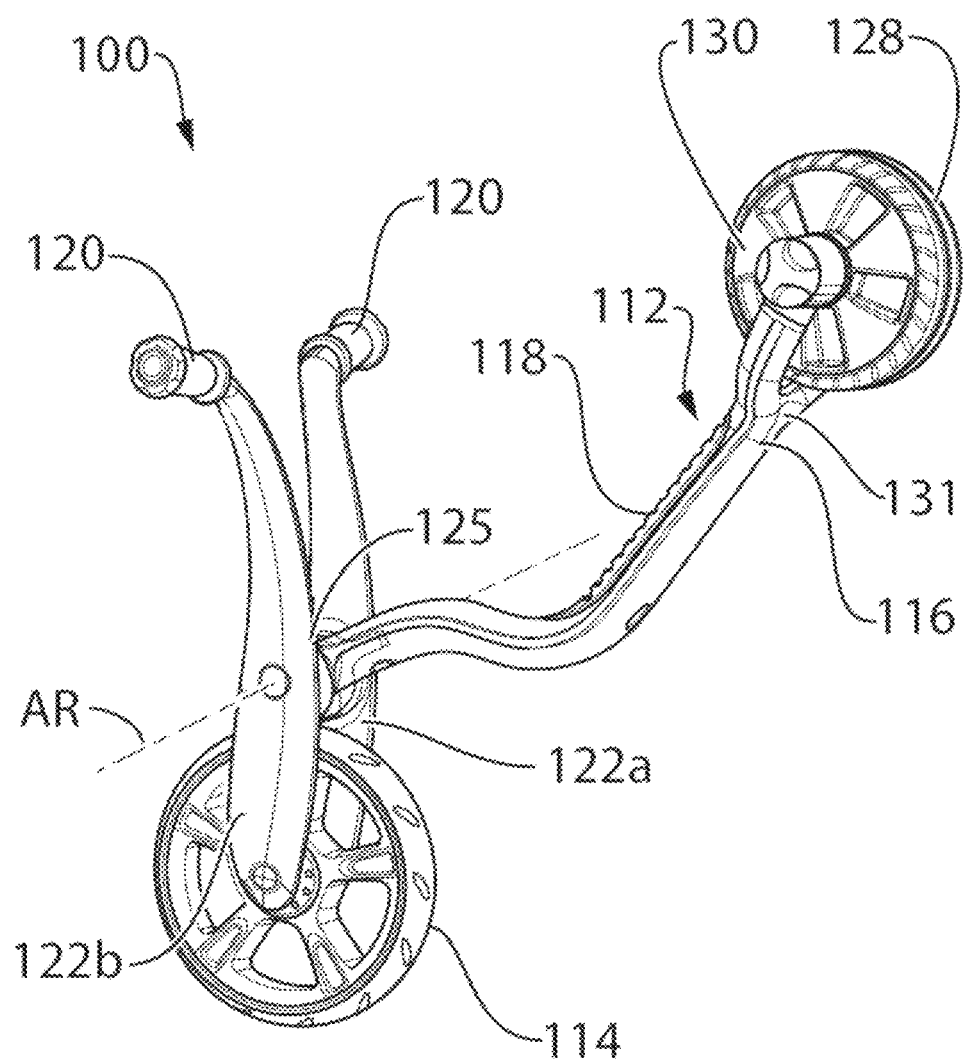

A first intermediate position for the first portion of the frame 112 that is being pivoted about the axis AR is shown in FIG. 16a. The first portion of the frame 112 may continue to be pivoted past this first intermediate position, through a second intermediate position shown in FIG. 16b, and finally to a position shown in FIG. 12c, so as to reconfigure the vehicle 100 as a scooter.

Thus, it will be understood that a first portion of the frame 112 that includes the main frame portion 118 is pivotably connected to a second frame portion that includes the front fork 122, for pivotal movement about the reconfiguration axis AR, during movement of the vehicle towards and away from the third position.

Figure 15A:
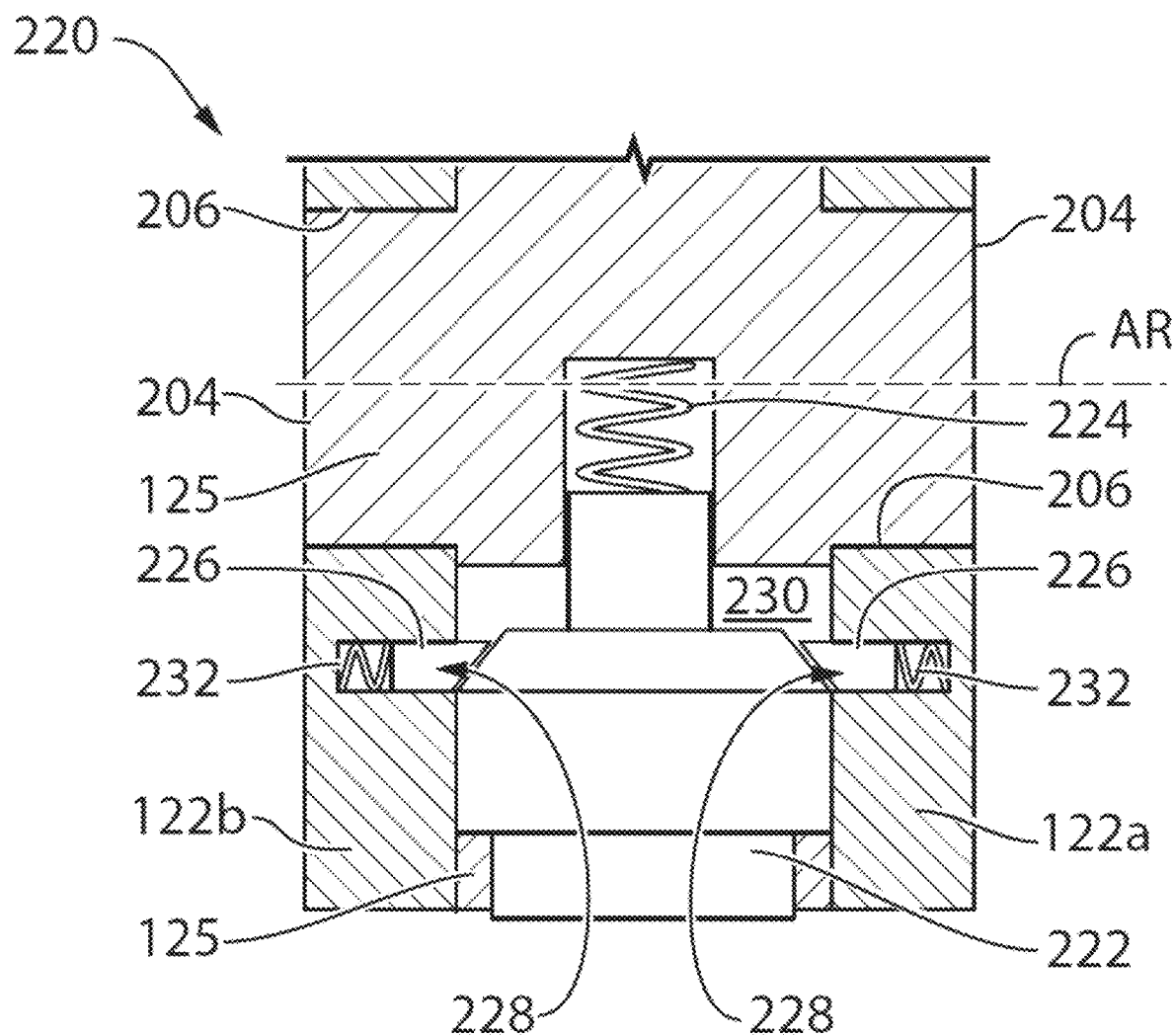
FIGS. 15a and 15b are sectional plan views that illustrate the movement of a locking structure for holding the frame of the vehicle in a selected position.
Figure 15B:
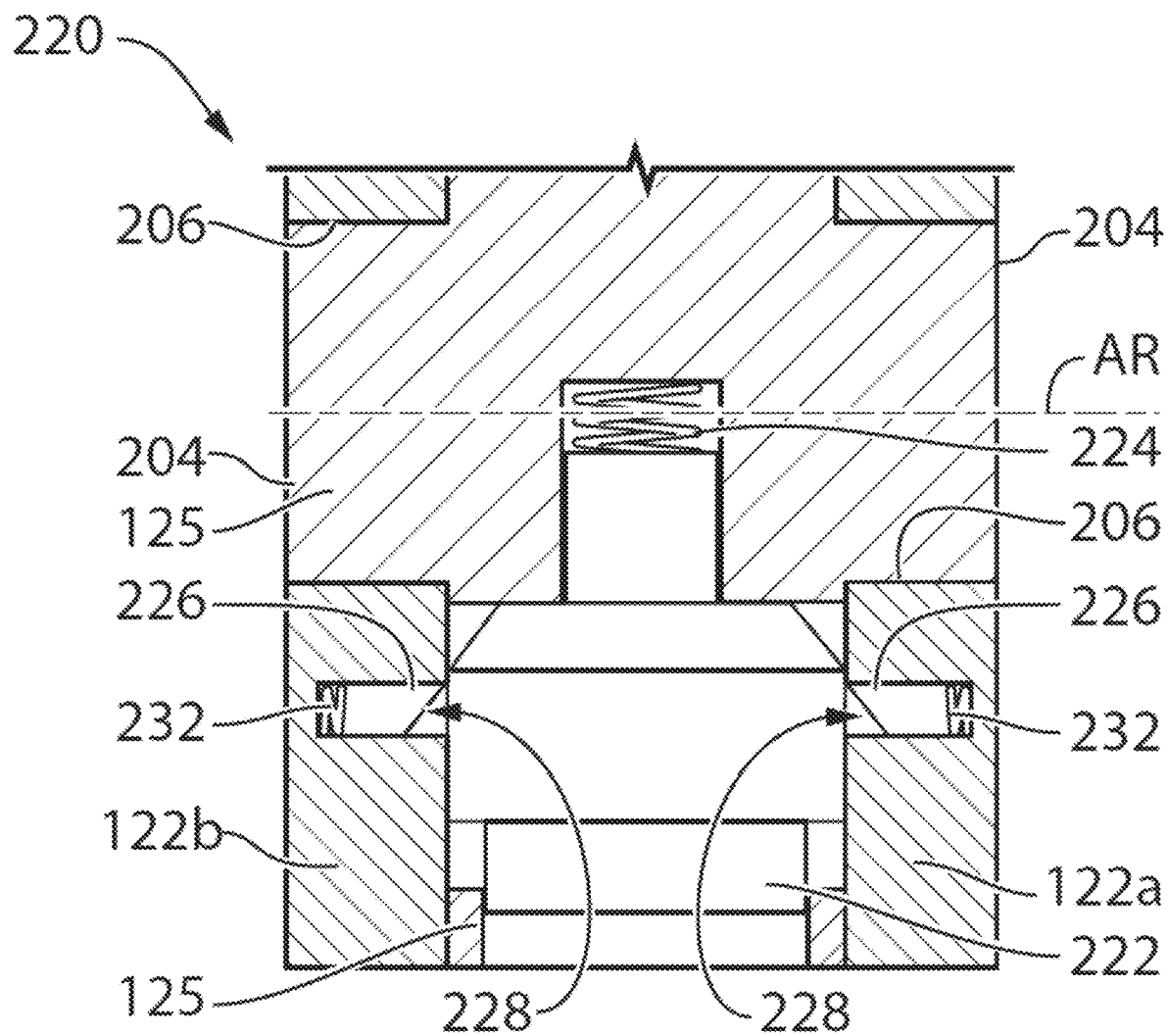
Figure 15C:
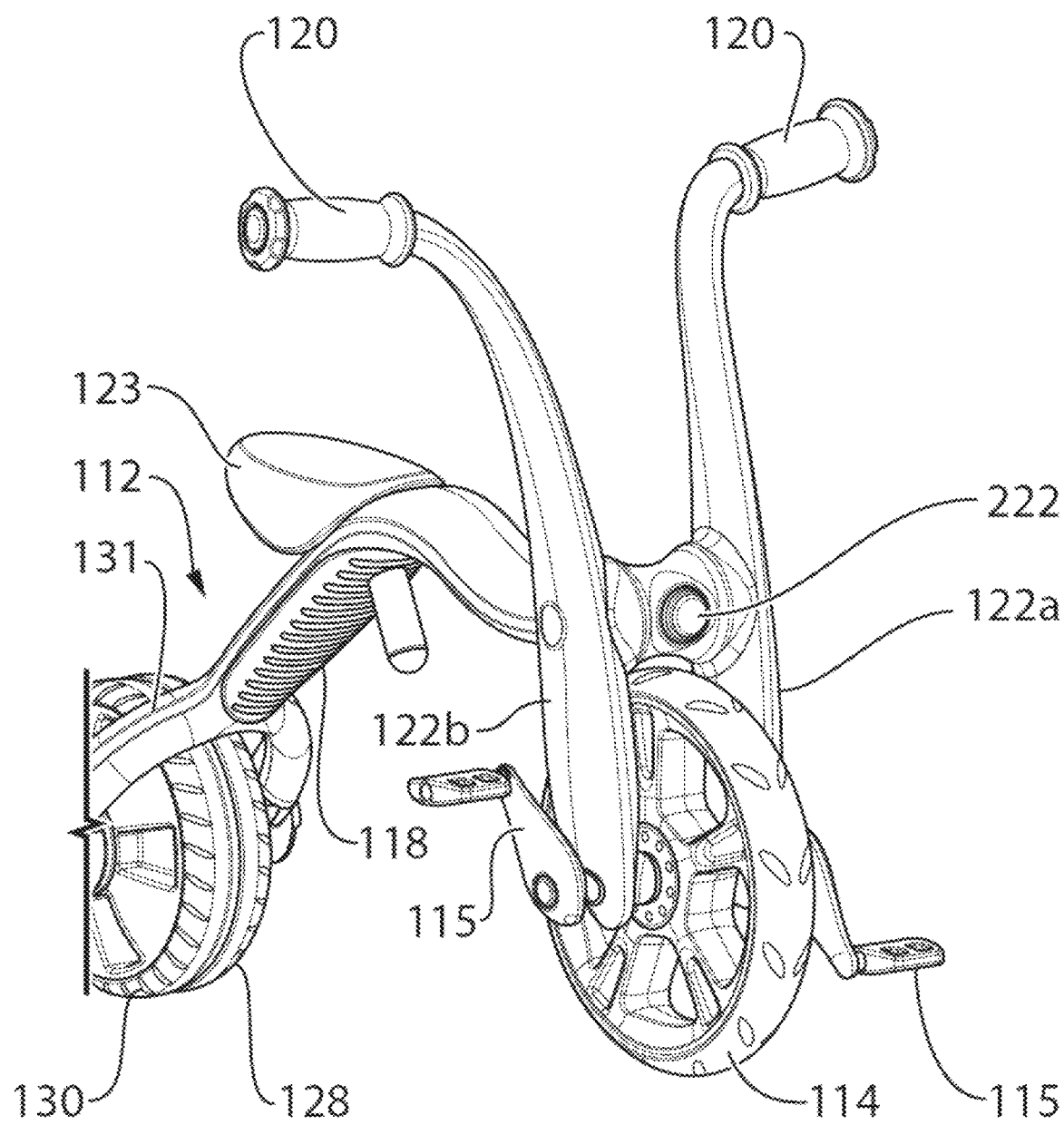
FIG. 15c is a perspective view showing the vehicle and an actuator from the locking structure shown in FIGS. 15a and 15b.

In order to ensure that the first and second frame portions do not inadvertently pivot relative to one another about the reconfiguration axis AR when the vehicle 100 is in use, the frame portions may be lockable relative to one another when the vehicle 100 is in the first, second and third positions. In order to lock the first and second portions of the frame 112 relative to one another in at least one position, the frame locking structure shown at 220 in FIGS. 15a, 15b and 15c may be used. The locking structure 220 includes an actuator 222, which may be a push-button as shown, an actuator biasing member 224, and at least one locking member 226. In the example shown there are two locking members 226. The locking members 226 each are positioned in a locking member aperture 228 in a suitable fork arm 122a or 122b. In the example shown locking member apertures 228 are provided in both the fork arms 122a and 122b. The locking members 226 are movable between a locking position and an unlocking position. In the locking position the locking members 226 extend from locking member apertures 228 and engage limit surfaces 230 on two sides of the locking members 226 so as to prevent pivoting of the front wheel support body 125 relative to the first and second fork arms 122a and 122b. The limit surface 230 on one side of the locking members 226 is shown. However, the limit surface on the other side is not shown since FIGS. 15a and 15b are section views.

In the unlocking position (FIG. 15b), the actuator 222 has driven the locking members 226 into their apertures 228 such that the locking members do not extend out between the limit surfaces 230. As a result, the front wheel support 125 is pivotable relative to the fork arms 122a and 122b. The actuator 222 may be biased towards its locking position by the actuator biasing member 224. The locking members 226 are biased towards the locking position by locking member biasing members 232.

By providing the locking members 226 at selected positions on the front fork, then they will engage the front wheel support 125 at selected angular positions to lock the front wheel support 125 and therefore the first frame portion at those positions. For example one position may be selected for when the frame 112 is arranged as shown in FIG. 12a. Another position may be selected to correspond to when the frame 112 is arranged as shown in FIG. 12c.

The biasing members 232 and 224 may be any suitable types of biasing members, such as, for example, helical compression springs.

While the locking structure shown in FIGS. 15a and 15b is useful, any other suitable locking structure may be provided, to lock the position of the vehicle 100 in one or more of the positions it is capable of assuming.

Additionally, as part of the conversion to a scooter, the seat 123 may be removed from the frame 112 and the pedals 115 (if present) may be removed from the front wheel 114 as they are not necessary when the vehicle 100 is being used as a scooter.

When the frame 112 is in the position shown in FIG. 12c, a foot deck 210 is positioned to support the foot of a rider of the vehicle 100. The rider is shown at 101 and is represented by a dashed outline. To support the foot of the rider, the foot deck 210 extends generally parallel to the longitudinal axis AL when the scooter so that the foot deck is generally horizontal when the scooter is in an upright position. The height of the foot deck 210 from the ground may be similar to that of a typical scooter (e.g. in the range of about 2.5" to about 4" above the ground G), however any other height may be used, as appropriate. The scooter shown and described herein may also be referred to as a kick scooter.

When the frame 112 is in the position shown in FIG. 12a (or the position shown in FIG. 12b), the frame 112 holds the seat 123 at a selected height above the ground G and in a position in which the seat 123 is generally arranged to support the rider's bottom. The height is selected to be appropriate for supporting the rider's bottom. For example the selected height may be about 12 inches above the ground G (i.e. about 12 inches from the ground to the top of the seat surface). Any other suitable height may be used, depending, for example on the age of the rider that is expected to ride the vehicle 100.

As can be seen from the description above and the figures, the structural assembly (which includes the frame 112 and the rear assembly 116) is positionable in a first position (FIG. 12a) in which the vehicle is a bicycle, a second position (FIG. 12b) in which the vehicle is a tricycle, and a third position in which the vehicle is a scooter.

It will be noted that, while the wheels 128 and 130 are shown in the position in which they face each other and are immediately adjacent one another when the vehicle 100 is in the third position, this need not be the case. In other words, the wheels 128 and 130 can be positioned in the position in which they face away from one another when the vehicle 100 is configured as a scooter. Thus the vehicle 100 can be converted between the second and third positions shown in FIGS. 12b and 12c, leaving the wheels 128 and 130 facing away from one another throughout the conversion.

Figure 17:
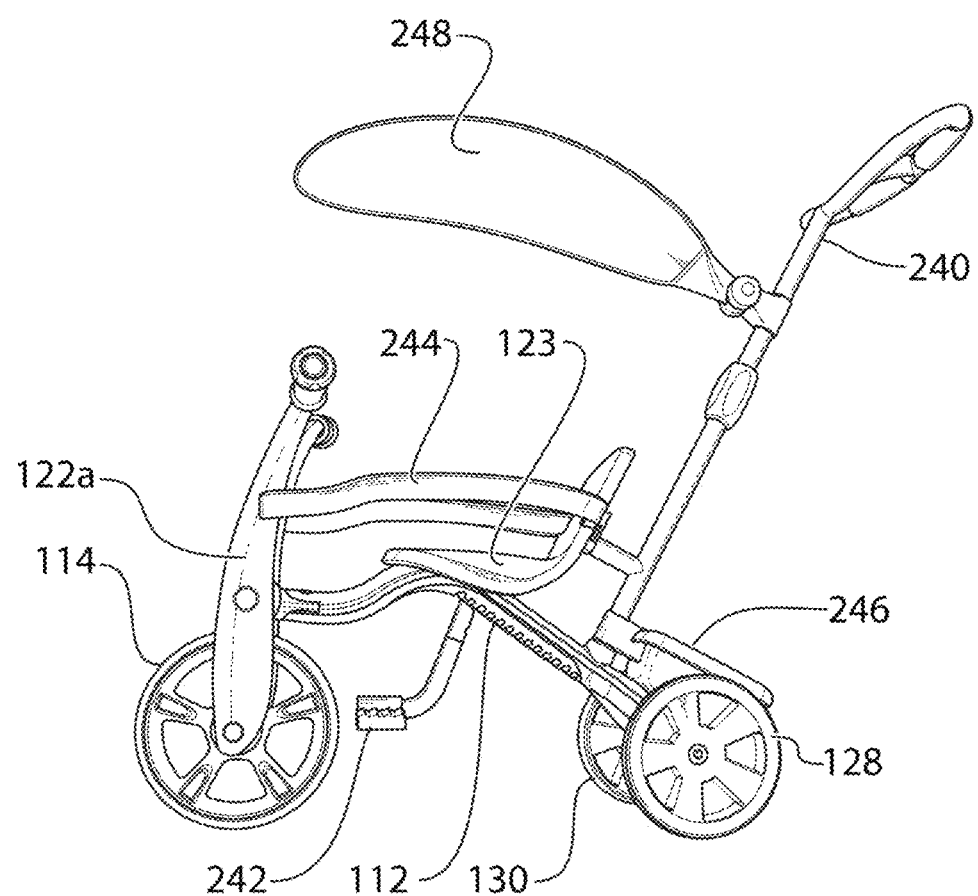
FIG. 17 shows the vehicle shown in FIG. 12b, with additional optional elements.

Reference is made to FIG. 17. As shown in FIG. 17, additional optional elements and features may be provided. For example, a parent-steering pole 240 may be provided, that fits in an aperture in the frame 112, particularly when the vehicle is configured to be a tricycle as shown in FIG. 12b. In addition to the parent-steering pole, a footrest 242 may be provided for a rider who is not pedaling to support their feet. The footrest 242 may mount to a bottom of the post for the seat 123. Also, a child support ring 244 is provided to support a young child in the seat 123. The child support ring 244 releasably fits over a version of the seat 123 that has a backrest, and may further include support arms that mount into the handlebars 120 (or any other suitable portion of the frame 112). A storage bin 246 may be provided that is supported on the parent-steering pole 240. A sun shield 248 may be provided and may be supported on the parent steering pole 240.

While it has been described for the vehicle 100 to be convertible between first, second and third forms or positions, an inventive aspect of the vehicle 100 is that it can convert between a tricycle form (as shown in FIG. 14) and a scooter form (as shown in FIG. 16).

While it has been described for the vehicle 100 to be convertible between first, second and third forms or positions, an inventive aspect of the vehicle 100 is that it can convert between a scooter form and another form, such as a bicycle form or a tricycle form by pivoting movement about a reconfiguration axis (AR) that extends generally transversely to a longitudinal axis (AL) of the vehicle 100.

Those skilled in the art will understand that a variety of modifications may be effected to the embodiments described herein without departing from the scope of the appended claims.

The invention claimed is:

1. A vehicle, comprising:
a frame;
a front wheel rotatably mounted to the frame; and
a rear assembly that includes
a first rear wheel support and a second rear wheel support, wherein each of the wheel supports is movably mounted to the frame, and
a first rear wheel and a second rear wheel, wherein the first and second rear wheels are rotatably mounted to the first and second rear wheel supports respectively,
wherein the rear assembly is positionable in a first position in which the first and second rear wheels are substantially immediately adjacent one another, and a second position in which the first and second rear wheels are spaced apart from one another,
wherein each rear wheel is pivotably connected to the respective rear wheel support for pivoting movement about a generally vertical axis so as to permit the first and second rear wheels to pivot between an inboard position relative to the rear wheel supports and an outboard position relative to the rear wheel supports.

2. A vehicle as claimed in claim 1, wherein each of the first and second rear wheels has a free end, and has a surface contour, and wherein when the rear assembly is in the first position the free ends face towards each other and the surface contours extend laterally towards each other substantially without discontinuity.

3. A vehicle as claimed in claim 2, wherein the surface contour is such that the first and second rear wheels substantially only contact a ground surface at the respective free ends.

4. A vehicle as claimed in claim 1, wherein each of the first and second rear wheels has a free end, wherein the free ends face each other when the rear assembly is in the first position and face away from each other when the rear assembly is in the second position.

5. A vehicle as claimed in claim 1, further comprising a wheel locking mechanism for each rear wheel, wherein the wheel locking mechanism is positionable to lock the respective rear wheel in each of the inboard and outboard positions.

6. A vehicle as claimed in claim 1, wherein, when the rear assembly is in the first position, the first and second rear wheel supports support outboard sides only of the first and second rear wheels.

7. A vehicle as claimed in claim 1, wherein each of the first and second rear wheel supports has a forward end that is pivotally mounted to the frame and a rearward end that supports one of the first and second rear wheels.

8. A vehicle as claimed in claim 7, wherein when the rear assembly is in the first position, the rear wheel supports are pivoted to a proximate position in which the rear wheel supports are proximate one another and when the rear assembly is in the second position the rear wheel supports are pivoted to a spaced apart position in which the rear wheel supports are spaced apart from one another.

9. A vehicle as claimed in claim 8, further comprising a wheel support locking mechanism that includes a slider that is movable between an unlocking position in which the slider permits the rear wheel supports to pivot between the proximate and spaced apart positions and a locking position in which the slider prevents movement of the rear wheel supports from one of the proximate and spaced apart positions to the other of the proximate and spaced apart positions.

10. A vehicle as claimed in claim 1, further comprising a pair of pedals operatively connected to the front wheel.

11. A vehicle as claimed in claim 1, wherein each of the first and second rear wheel supports has a forward end that is pivotally mounted to the frame and a rearward end that supports one of the first and second rear wheels, wherein the first and second rear wheel supports are pivotably mounted to the frame for movement between a proximate position in which the rear wheel supports are proximate one another and a spaced apart position in which the rear wheel supports are spaced apart from one another, and wherein each rear wheel is pivotably connected to the respective rear wheel support for pivoting movement about a generally vertical axis so as to permit the first and second rear wheels to pivot between an inboard position relative to the rear wheel supports and an outboard position relative to the rear wheel supports, and wherein, when the rear assembly is in the first position the rear wheel supports are pivoted to the proximate position and the rear wheels are pivoted to the inboard positions, and when the rear assembly is in the second position the rear wheel supports are pivoted to the spaced apart position and the rear wheels are pivoted to the outboard positions.

12. A vehicle as claimed in claim 1, wherein the front wheel is supported on a fork, which is pivotally connected to the frame, and is steerable via a handlebar.

13. A vehicle as claimed in claim 1, wherein the frame and rear assembly are positionable in a first position relative to a front fork that supports the front wheel such that the frame is positioned to hold a seat at a selected seat elevation, and in a second position relative to the front fork such that a foot deck portion of the frame is positioned to support a foot of a rider of the vehicle.

14. A vehicle comprising:
a frame;
a front wheel rotatably mounted to the frame; and
a rear assembly that includes
a first rear wheel support and a second rear wheel support, wherein each of the wheel supports is movably mounted to the frame, and
a first rear wheel and a second rear wheel, wherein the first and second rear wheels are rotatably mounted to the first rear wheel support and second rear wheel support, respectively,
wherein the rear assembly is positionable in a first position in which the first and second rear wheels are substantially immediately adjacent one another, and a second position in which the first and second rear wheels are spaced apart from one another,
wherein each of the first and second rear wheel supports has a forward end that is pivotally mounted to the frame and a rearward end that supports one of the first and second rear wheels,
wherein when the rear assembly is in the first position, the rear wheel supports are pivoted to a proximate position in which the rear wheel supports are proximate one another and when the rear assembly is in the second position the rear wheel supports are pivoted to a spaced apart position in which the rear wheel supports are spaced apart from one another,
wherein the first and second rear wheel supports are synchronously joined together for synchronous movement between the proximate and spaced apart positions.

15. A vehicle as claimed in claim 14, wherein the first and second rear wheel supports are biased towards the proximate position.

16. A vehicle comprising:
a frame;
a front wheel rotatably mounted to the frame; and
a rear assembly that includes
a first rear wheel support and a second rear wheel support, wherein each of the wheel supports is movably mounted to the frame, and
a first rear wheel and a second rear wheel, wherein the first and second rear wheels are rotatably mounted to the first rear wheel support and second rear wheel support, respectively,
wherein the rear assembly is positionable in a first position in which the first and second rear wheels are substantially immediately adjacent one another, and a second position in which the first and second rear wheels are spaced apart from one another,
wherein each of the first and second rear wheel supports has a forward end that is pivotally mounted to the frame and a rearward end that supports one of the first and second rear wheels,
wherein when the rear assembly is in the first position, the rear wheel supports are pivoted to a proximate position in which the rear wheel supports are proximate one another and when the rear assembly is in the second position the rear wheel supports are pivoted to a spaced apart position in which the rear wheel supports are spaced apart from one another,
further comprising a wheel support locking mechanism that includes a slider that is movable between an unlocking position in which the slider permits the rear wheel supports to pivot between the proximate and spaced apart positions and a locking position in which the slider prevents movement of the rear wheel supports from one of the proximate and spaced apart positions to the other of the proximate and spaced apart positions,
wherein the slider is biased towards the locking position.

* * * * *